(12) United States Patent
Fujinami

(10) Patent No.: US 7,986,628 B2
(45) Date of Patent: Jul. 26, 2011

(54) COMMUNICATION APPARATUS AND PROGRAM THEREFOR, AND DATA FRAME TRANSMISSION CONTROL METHOD

(75) Inventor: Makoto Fujinami, Minato-ku (JP)

(73) Assignee: NEC Corporation, Tokyo (JP)

( * ) Notice: Subject to any disclaimer, the term of this patent is extended or adjusted under 35 U.S.C. 154(b) by 231 days.

(21) Appl. No.: 12/335,067

(22) Filed: Dec. 15, 2008

(65) Prior Publication Data

US 2009/0154496 A1 Jun. 18, 2009

(30) Foreign Application Priority Data

Dec. 17, 2007 (JP) ................................. 2007-324577

(51) Int. Cl.
*G01R 31/08* (2006.01)
*G06F 11/00* (2006.01)
*H04J 3/22* (2006.01)
*H04J 3/24* (2006.01)

(52) U.S. Cl. ......... 370/235; 370/253; 370/469; 370/473

(58) Field of Classification Search .................. 370/235, 370/253, 469, 473
See application file for complete search history.

(56) References Cited

U.S. PATENT DOCUMENTS

| | | | | |
|---|---|---|---|---|
| 6,564,267 | B1 * | 5/2003 | Lindsay | 709/250 |
| 7,305,492 | B2 * | 12/2007 | Bryers et al. | 709/249 |
| 7,590,118 | B2 * | 9/2009 | Giesberts et al. | 370/392 |
| 2004/0252688 | A1 * | 12/2004 | May et al. | 370/389 |
| 2006/0013256 | A1 * | 1/2006 | Lee et al. | 370/473 |
| 2007/0297375 | A1 * | 12/2007 | Bonta et al. | 370/338 |
| 2008/0080619 | A1 * | 4/2008 | Heng et al. | 375/240.18 |
| 2008/0130538 | A1 * | 6/2008 | Raissinia et al. | 370/310 |
| 2008/0133996 | A1 * | 6/2008 | Naka et al. | 714/748 |
| 2009/0141723 | A1 * | 6/2009 | Giesberts et al. | 370/392 |
| 2009/0183057 | A1 * | 7/2009 | Aizman | 714/807 |
| 2009/0196247 | A1 * | 8/2009 | Fan et al. | 370/329 |
| 2009/0196364 | A1 * | 8/2009 | Nakajima et al. | 375/260 |
| 2009/0252219 | A1 * | 10/2009 | Chen et al. | 375/240.02 |
| 2010/0008247 | A1 * | 1/2010 | Kwon et al. | 370/252 |
| 2010/0091759 | A1 * | 4/2010 | Stahl et al. | 370/347 |
| 2010/0106874 | A1 * | 4/2010 | Dominguez et al. | 710/260 |

FOREIGN PATENT DOCUMENTS

| | | |
|---|---|---|
| JP | 2001-186179 A | 7/2001 |
| JP | 2003-198556 A | 7/2003 |

* cited by examiner

*Primary Examiner* — Chi H Pham
*Assistant Examiner* — Farah Faroul
(74) *Attorney, Agent, or Firm* — Sughrue Mion, PLLC

(57) ABSTRACT

A communication apparatus including a physical layer processing unit that transmits data to a communication medium and a lower-layer processing unit that performs transmission control is provided. The transmission control includes at least one of aggregated-frame transmission control in which a data frame is supplied to the physical layer processing unit as an aggregated frame by aggregating the data frame with at least one other data frame, and single-frame transmission control in which the data frame is supplied to the physical layer processing unit as a single frame. The lower-layer processing unit determines whether to supply the data frame to the physical layer processing unit as the aggregated frame by performing the aggregated-frame transmission control or as the single frame by performing the single-frame transmission control based on a type of data contained in a payload of the data frame.

17 Claims, 18 Drawing Sheets

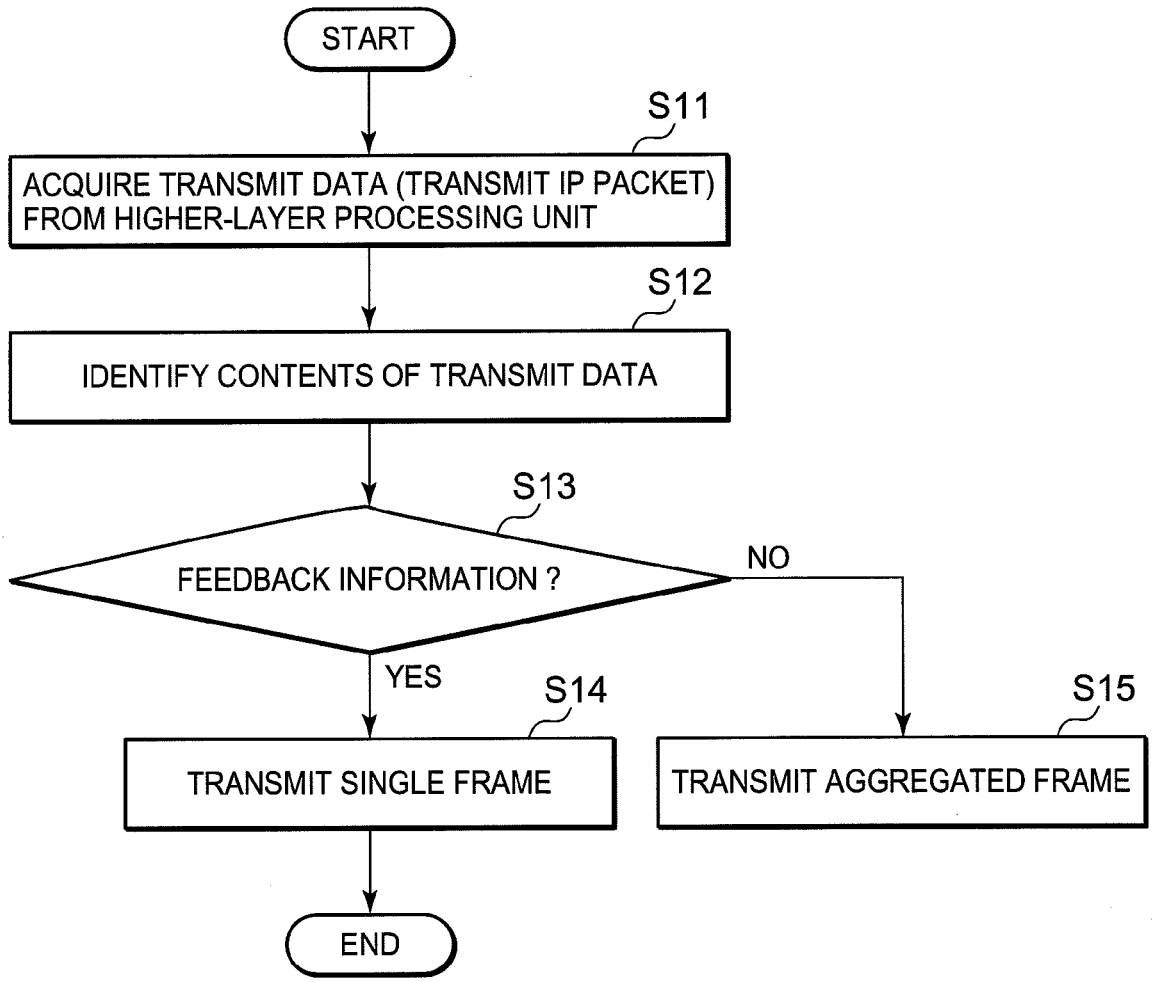

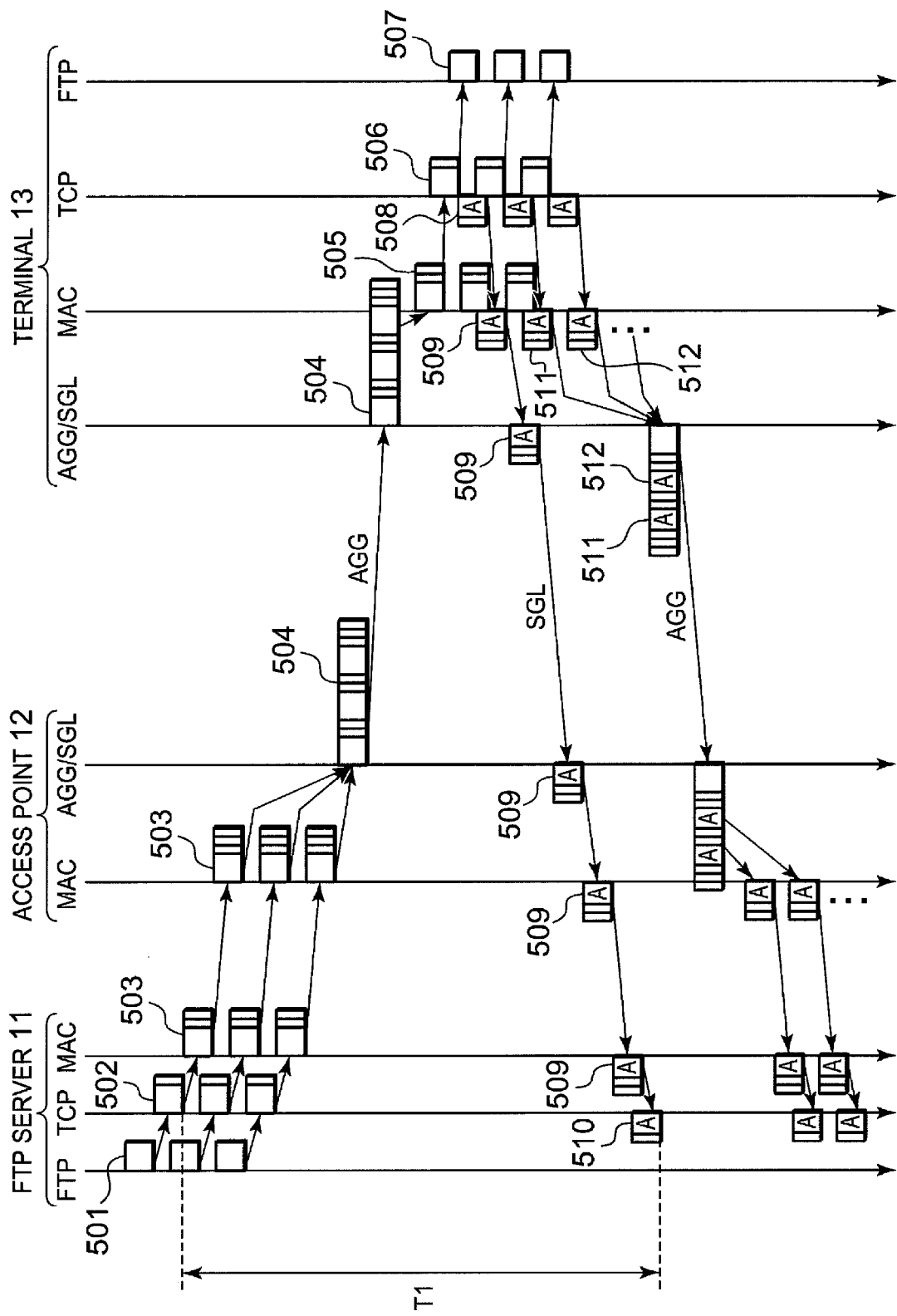

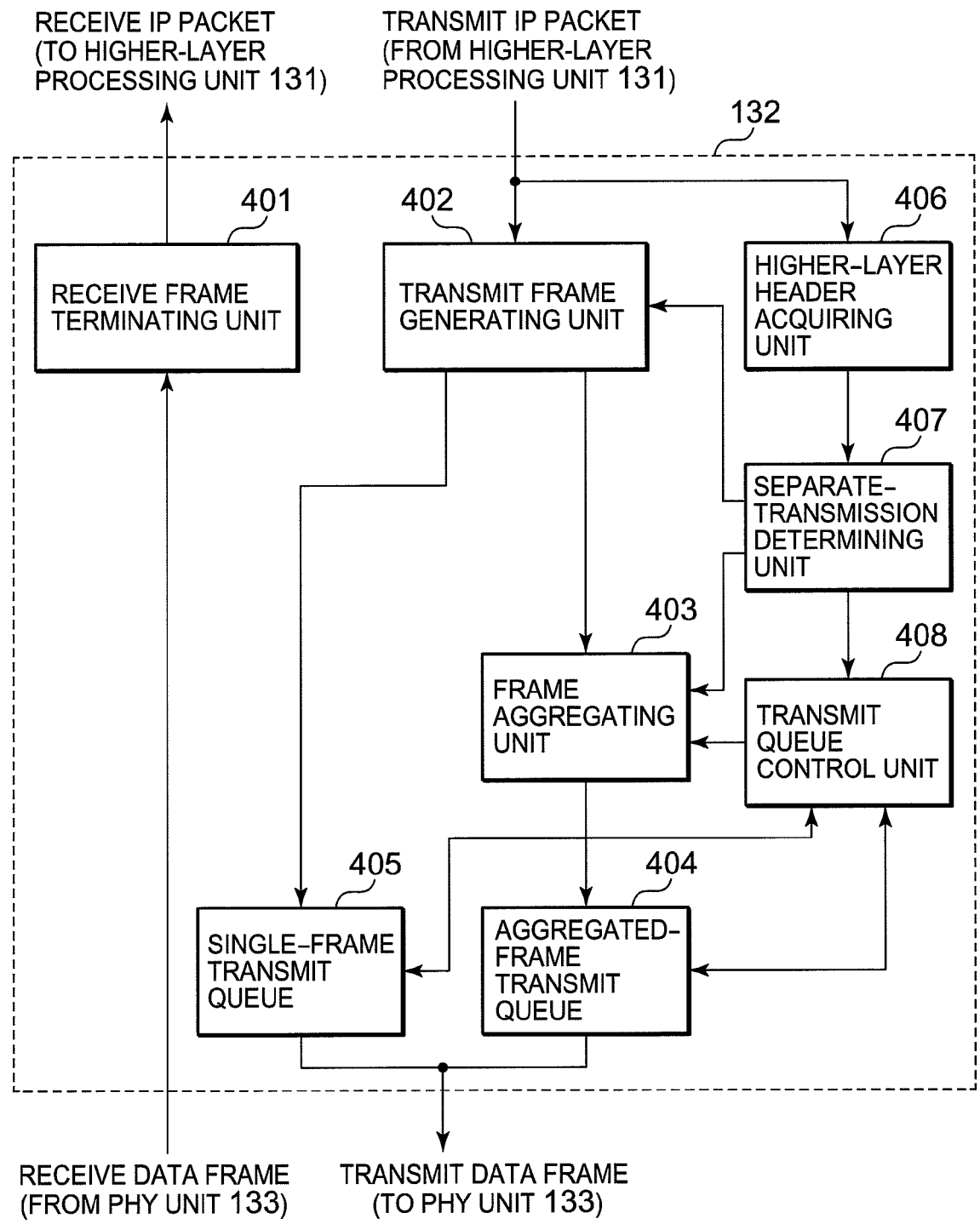

RELATED ART

COMMUNICATION APPARATUS AND PROGRAM THEREFOR, AND DATA FRAME TRANSMISSION CONTROL METHOD

This application is based upon and claims priority from Japanese patent application No. 2007-324577, filed on Dec. 17, 2007 in the Japanese Patent Office, the disclosure of which is incorporated herein its entirely by reference.

BACKGROUND

1. Field of the Invention

Apparatus and methods consistent with the present invention relate to a communication apparatus which performs wireless communication of data frames, and in particular, to a communication apparatus capable of transmitting and receiving an aggregated frame created by aggregating a plurality of data frames.

2. Description of the Related Art

Packet communication is conducted by exchanging fixed-length or variable-length data units called data packets or data frames between terminals. In particular, packet communication conducted via a wireless communication medium is referred to as wireless packet communication. Wireless packet communication has a higher probability of data error during transmission/reception of data frames (data packets) than wired packet communication. Therefore, in wireless packet communication which uses, for example, a medium access control method based on the IEEE 802.11 standard, to increase reliability of communication a receiving terminal which has successfully received a data frame returns an ACK frame to a sending terminal that is a communication partner, thereby informing the sending terminal about the successful reception of the data frame.

However, in wireless packet communication, if an ACK frame is transmitted upon reception of each data frame, in spite of improved reliability, communication efficiency will be reduced compared to wired packet communication which does not use ACK frames. As shown in FIG. 19, to reduce the time required to transmit and receive ACK frames and communicate data frames efficiently, a technique has been proposed in which a transmitting terminal 851 transmits a data frame (hereinafter referred to as an aggregated frame) 80 created by aggregating a plurality of data packets, and a receiving terminal 852 reports successful reception of a plurality of data frames 82 contained in the aggregated frame 80 all at once using an ACK frame block 83 as shown in FIG. 19. Hereinafter the technique for transmitting data frames in aggregate form will be referred to as frame aggregation.

For example, under wireless LAN (Local Area Network) standard IEEE 802.11n being worked out by the IEEE 802 Committee, frame aggregation is being considered for adoption in the MAC (Media Access Control) sub-layer. FIG. 20 shows a packet format for aggregated frames described in IEEE 802.11n Draft 2.0. The aggregated frame in FIG. 20 is an A-MPDU (Aggregated MPDU) which is an aggregation of multiple MPDUs (MAC Protocol Data Units). The aggregated frame serves as a PSDU (Physical-layer Service Data Unit), which is a data unit supplied to the physical layer. In FIG. 12, multiple MPDUs are aggregated, and are delimited by control data (delimiter).

The wireless packet communication described above is implemented by the physical layer and the data-link layer of the OSI (Open Systems Interconnection) Basic Reference Model. On the other hand, a typical example of a protocol that implements congestion control and flow control in the transport layer, which is a higher layer of the wireless packet communication, is TCP (Transmission Control Protocol). TCP supports so-called feedback flow control, according to which a sending party adjusts a transmission data rate by using feedback information from a receiving party. TCP implements congestion control and flow control by causing each of a sending terminal and receiving terminal of TCP segments to manage a variable corresponding to transmit or receive buffer capacity, where the variable is called a window. Control using the window variable is referred to as window control, and is well known as a control method for data transfer. TCP header format defines a window size field for use to notify the sending party of a receive window size. The receiving terminal of TCP segments uses a TCP ACK segment, which is one of the TCP segments, to inform the sending terminal about the window size of the receiving terminal. The TCP ACK segment is created by setting an ACK flag in a TCP header to be ON.

The sending party of TCP segments can determine the first byte and length of a packet to be transmitted next, based on an acknowledge number in the TCP ACK segment delivered from the receiving party. Therefore, upon receiving a TCP segment, the receiving terminal needs to send out a TCP ACK segment to the sending terminal as soon as possible to notify the sending terminal of completion of reception. However, it is inefficient to send out a TCP ACK segment upon arrival of each TCP segment at the receiving terminal, because this increases the consumption of wireless resources. To deal with this, the receiving terminal normally accumulates some number of received TCP segments using a timer, and then transmits a TCP ACK segment that indicates completion of reception of multiple TCP segments.

Japanese Patent Laid-Open No. 2001-186179 (hereinafter, "Patent Document 1") discloses a technique for data packet transfer control using TCP. According to the technique disclosed in Patent Document 1, at the start of transmission/reception of data packets, a receiving terminal returns a TCP ACK segment to a sending terminal without waiting for the expiration of waiting time defined for a receive window size.

Japanese Patent Laid-Open No. 2003-198556 (Hereinafter, "Patent Document 2") discloses a wireless base station and a wireless terminal that transmit and receive data packets generated in a layer higher than a layer in which wireless transmission is conducted. When transmitting a ACK packet (specifically, a TCP ACK segment) on an uplink indicating that a data packet has been successfully received on a downlink going from the wireless base station to the wireless terminal, the wireless terminal changes a modulation method and coding rate to reduce a code error rate on the uplink. On the other hand, when a request for permission to transmit an ACK packet is received from a wireless terminal, the wireless base station gives transmission permission preferentially to the sender of the permission request.

In the related art, as described above, communication is conducted using both the frame aggregation performed in the MAC sub-layer and lower layers, and the feedback flow control performed in a higher layer such as the TCP layer. Therefore, there is a problem that transmission of feedback information, such as a TCP ACK segment from the receiving party, has to wait while frame aggregation is being performed in the lower layer to improve communication efficiency, although the feedback information is needed for the flow control performed in the higher layer. That is, pursuit of communication efficiency in lower layers (the data-link layer and below) can reduce throughput in a higher layer (TCP layer: transport layer).

Patent Document 1 only discloses how to transmit a TCP ACK segment in the transport layer without waiting for the expiration of the predetermined waiting time defined for the receive window size. Patent Document 1 does not suggest any way to solve the above-described problem that a transmission delay of feedback information caused by frame aggregation in lower layers can reduce throughput in a higher layer.

Patent Document 2 discloses a technique for changing the modulation method and coding rate in the physical layer during transmission of an IP packet containing a TCP ACK segment in its payload (hereinafter such an IP packet is referred to as "TCP ACK packet") to improve the communication quality of the wireless links and thereby improve the transmission success of the TCP ACK packet. Also, Patent Document 2 discloses a technique for granting transmission permission preferentially to the sender wireless terminal of the TCP ACK packet, regardless of the communication quality of the uplink, even when the order of precedence in which transmission permission is granted to a plurality of wireless terminals by a wireless base station is determined according to the communication quality of the uplink between the wireless base station and each wireless terminal. However, Patent Document 2 does not suggest any way to solve the above-described problem that a transmission delay of feedback information caused by frame aggregation in lower layers can reduce throughput in a higher layer.

In feedback flow control at level 3 and higher levels of the OSI Basic Reference Model, the feedback information transmitted from the receiving party to the sending party is not limited to a TCP ACK segment. An example of the feedback information for flow control is a receiver report of RTP stream data transmitted from a receiving party to a sending party according to RTCP (RTP Control Protocol) used in conjunction with RTP (Real-time Transport Protocol) which is a transfer protocol for stream data. A sending apparatus provided with an RTCP receiver report from a receiving party can also adjust the transmission data rate.

SUMMARY

Embodiments of the present invention overcome the above described disadvantages and other disadvantages not described above. Also, the present invention is not required to overcome the disadvantages described above, and embodiments of the present invention may not overcome any of the problems described above.

According to an aspect of the present invention, there is provided a communication apparatus including a physical layer processing unit that transmits data to a communication medium and a lower-layer processing unit that performs transmission control. The transmission control includes at least one of aggregated-frame transmission control in which a data frame is supplied to the physical layer processing unit as an aggregated frame by aggregating the data frame with at least one other data frame, and single-frame transmission control in which the data frame is supplied to the physical layer processing unit as a single frame. The lower-layer processing unit determines whether to supply the data frame to the physical layer processing unit as the aggregated frame by performing the aggregated-frame transmission control or as the single frame by performing the single-frame transmission control based on a type of data contained in a payload of the data frame.

Also, according to another aspect of the present invention, there is provided a data frame transmission control method including an identifying operation including identifying a type of data contained in a payload of a data frame, and a first determining operation including determining whether to transmit the data frame to a communication medium as an aggregated frame by aggregating the data frame with at least one other data frame or as a single frame based on the type, of data identified by the identifying operation.

Also, according to yet another aspect of the present invention, there is provided a computer-readable medium comprising software instructions for the data frame transmission control method described above.

BRIEF DESCRIPTION OF THE DRAWINGS

The above and other aspects of the present invention will become more apparent from the following detailed description of embodiments taken in conjunction with the accompanying drawings, in which:

FIG. 5 is a flowchart showing transmission control procedures of a MAC unit of the terminal included in the communication system according to the first embodiment of the present invention;

FIG. 6A is a timing chart showing an example of data transfer among an FTP server, access point, and terminal according to the first embodiment of the present invention;

FIG. 7 is a block diagram showing a first configuration example of the MAC unit of the terminal included in the communication system according to the first embodiment of the present invention;

DETAILED DESCRIPTION OF EMBODIMENTS OF THE PRESENT INVENTION

Figure 1:
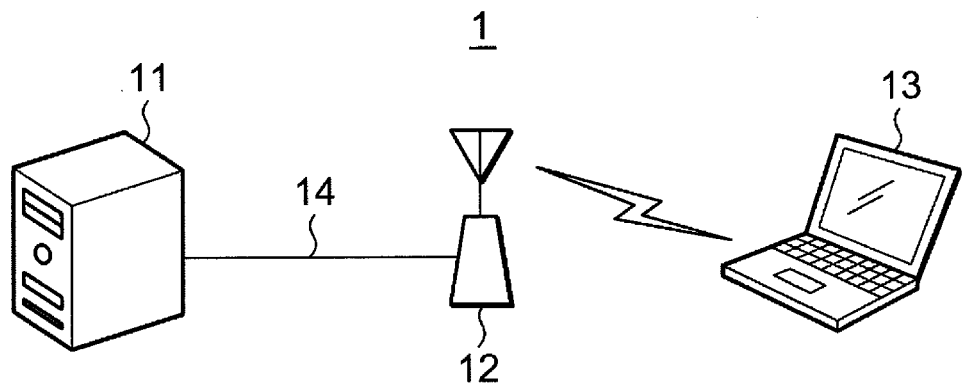
FIG. 1 is a schematic diagram showing a communication system according to a first embodiment of the present invention.

Hereinafter, embodiments of the present invention are described in detail with reference to the drawings, wherein the same components will be denoted by the same reference numerals for clarity of explanation, and redundant description thereof will be omitted as required.

First Embodiment of the Present Invention

FIG. 1 is a block diagram of a communication system 1 according to a first embodiment of the present invention. In the example of FIG. 1, the communication system 1 includes an FTP (File Transfer protocol) server 11, a wireless LAN access point 12, and a terminal 13. The FTP server 11 is an apparatus that transfers data files by FTP and transmits and receives data segments under TCP window control. In the example of FIG. 1, the FTP server 11 is connected with the access point 12 via a communication cable 14 used by a wired LAN, such as 100BASE-TX standardized by IEEE 802.3.

The access point 12 is a wireless LAN access point device, and functions as a Layer 2 bridge that relays data between a wired LAN and wireless LAN. The terminal 13 is connected to the access point 12 via a wireless interface. Wireless transmission can be carried out between the access point 12 and terminal 13 using aggregated frames generated by aggregation of MAC (Media Access Control) frames, which are data units in a data-link layer of the wireless LAN. Such frame aggregation is adopted by a high-speed LAN standard being worked out as IEEE 802.11n.

FTP file transfer from the FTP server 11 to the terminal 13 will be described below as an example. Needless to say, the FTP server 11 is only an example of a communication apparatus that transmits and receives data segments under window control. If TCP is used in the transport layer, not only FTP, but also HTTP (Hyper-Text Transfer Protocol), SMTP (Simple Mail Transfer Protocol), and the like may be used in the application layer above the transport layer. Also, TCP is only an example of a transport protocol that uses window control, and another protocol may be used instead. Also, although a single terminal 13 is shown in FIG. 1 for convenience of explanation, the access point 12 may be configured to be connectable with two or more terminals 13.

Figure 2:
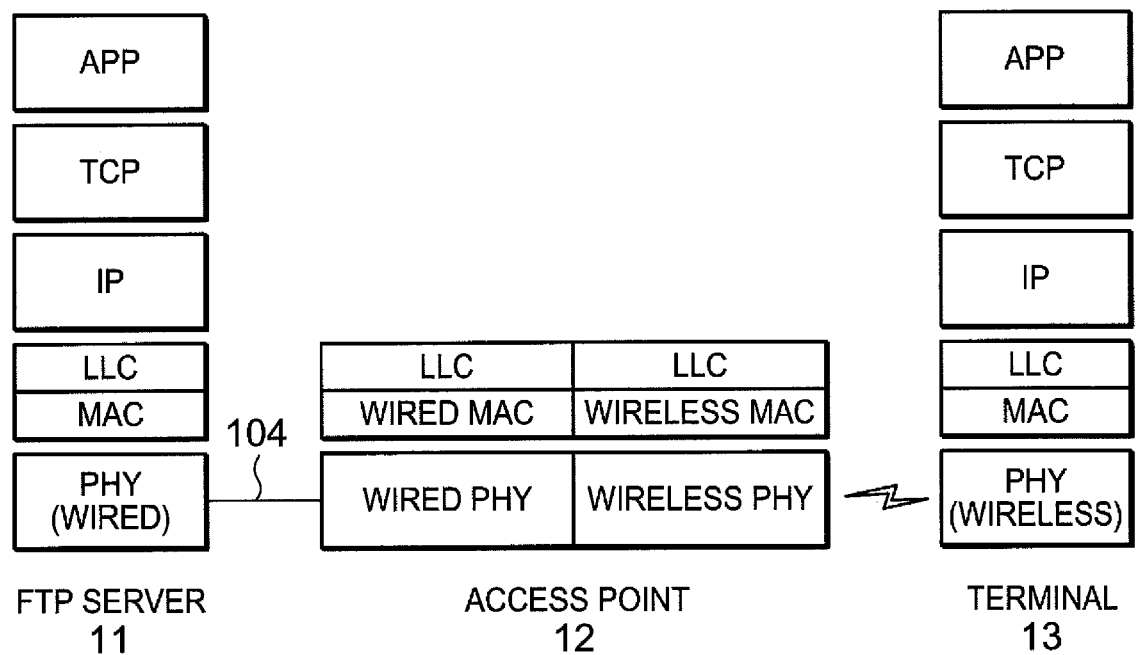
FIG. 2 is a diagram showing a logical layer configuration of the communication system according to the first embodiment of the present invention.

FIG. 2 is a schematic diagram showing protocol stacks of the FTP server 11, the access point 12, and the terminal 13 included in the communication system 1. The protocol stack of the FTP server 11 has multiple layers, following the example of the OSI Basic Reference Model or an Internet model. Specifically, the protocol stack includes a physical layer (PHY), a data-link layer (MAC sub-layer and LLC sub-layer), a network layer (IP layer), a transport layer (TCP layer), and an application layer (APP layer) starting from the bottom layer.

Similarly, the protocol stack of the access point 12 includes a physical layer (PHY) and a data-link layer (MAC sub-layer and LLC sub-layer). Since the access point 12 operates as a bridge, two protocol stacks are illustrated in FIG. 2: one each on both the wireless-LAN side and the wired-LAN side.

Similarly, the protocol stack of the terminal 13 includes a physical layer (PHY), a data-link layer (MAC sub-layer and LLC sub-layer), a network layer (IP layer), a transport layer (TCP layer), and an application layer (APP layer).

Data generated in the APP layer of the FTP server 11 have protocol headers added in the TCP layer, the IP layer, and the MAC layer in this order. Then, the data is modulated in the physical layer and transmitted. A signal outputted to the communication cable 14 by the FTP server 11 is modulated in the PHY layer of the access point 12, and a resulting MAC frame is sent to the MAC layer. The MAC layer of the access point 12 determines a destination terminal to which the MAC frame is sent next, based on a destination MAC address of the MAC frame, and performs scheduling to send the MAC frame to the destination terminal.

Next, the protocol stack of the access point 12 will be described. The wireless MAC layer of the access point 12 generates MAC frames containing data segments (specifically, IP packets) relayed from the wired-LAN side and supplied to the wireless MAC layer in their payloads, and supplies the MAC frames in a separate form or an aggregate form to the PHY layer.

To curb reduction of TCP throughput due to packet loss or delay while improving transfer efficiency by frame-aggregation, the wireless MAC layer of the access point 12 transmits MAC frames containing IP packets including ordinary TCP segments as aggregated frames using frame aggregation, and transmits a MAC frame containing. If packet loss or packet delay occurs, a MAC frame, which has a TCP ACK packet to be transmitted to another communication terminal in the payload thereof, is transmitted without aggregation with other MAC frames. Hereinafter, control used to supply aggregated frames to the PHY layer is referred to as "aggregate transmission control," and control used to supply MAC frames not aggregated with any other MAC frame to the PHY layer is referred to as "separate transmission control".

If a MAC frame containing a TCP ACK packet in its payload has already been aggregated with another MAC frame, the wireless MAC layer of the access point 12 may preferentially transmit the aggregated frame containing the TCP ACK packet. Also, if a MAC frame containing a TCP ACK packet in its payload is waiting to be transmitted for aggregation with another MAC frame, the wireless MAC layer of the access point 12 may preferentially transmit the aggregated frame containing the TCP ACK packet in its payload by interrupting the frame aggregation process.

The wireless MAC sub-layer of the access point 12 may detect packet loss and delay by monitoring transport headers (and thus, the TCP headers) contained in data segments relayed from the wired-LAN side and supplied to the wireless MAC sub-layer. Specifically, the wireless MAC sub-layer may acquire sequence numbers of the TCP headers and record the acquired sequence numbers by associating them with the times of acquisition. Then the wireless MAC sub-layer can transmit the MAC frame containing a TCP ACK packet in its payload without aggregating it with any other MAC frame as described above if there is something abnormal about the time variation of the sequence numbers of the TCP headers, such as if there is some variation in the change in a rate per time or if the sequence numbers decrease discontinuously.

The operation of transmitting a MAC frame containing a TCP ACK packet singly without aggregation with any other MAC frame in case of TCP-segment loss or delay is only exemplary. The MAC frame containing a TCP ACK packet may always be transmitted singly without aggregation with any other MAC frame.

Looking at the reception of a wireless signal by the access point 12, the PHY layer of the access point 12 demodulates a wireless signal received from the terminal 13 and supplies the demodulated aggregated frame or MAC frame to the wireless MAC sub-layer. If the destination of the MAC frame supplied from the PHY layer is another wireless terminal, the wireless MAC sub-layer of the access point 12 sends the MAC frame back to the PHY layer. On the other hand, if the destination of the MAC frame supplied from the PHY layer is the MAC address of the access point 12, i.e., if the MAC frame supplied from the PHY layer contains data to be transferred to the wired-LAN side, the data is passed to the wired MAC layer.

Next, the protocol stack of the terminal 13 will be described. The PHY layer of the terminal 13 demodulates a wireless signal received from the access point 12 and supplies the demodulated aggregated frame or MAC frame to the MAC sub-layer. The MAC sub-layer, the IP layer, and the TCP layer of the terminal 13 remove the respective headers added by the sending party and pass the frame to the APP layer (i.e., an FTP client). The TCP layer of the terminal 13 generates a TCP ACK segment when a TCP segment is received, and transmits the TCP ACK segment to the sending party (access point 12, in this case) of the TCP segment via the MAC sub-layer and the PHY layer.

The MAC sub-layer of the terminal 13 transmits the MAC frame containing the TCP ACK packet constituted of a TCP segment separately without aggregation with any other MAC frame, as is the case with the wireless MAC sub-layer of the access point 12 described above. The MAC sub-layer of the terminal 13 may monitor the time variation of TCP sequence numbers, and in case of a TCP-segment loss or delay, the MAC sub-layer may transmit the MAC frame containing a subsequent TCP ACK packet separately without aggregation with any other MAC frame. Alternatively, the MAC frame containing a TCP ACK packet may always be transmitted separately without aggregation with any other MAC frame.

Figure 3:
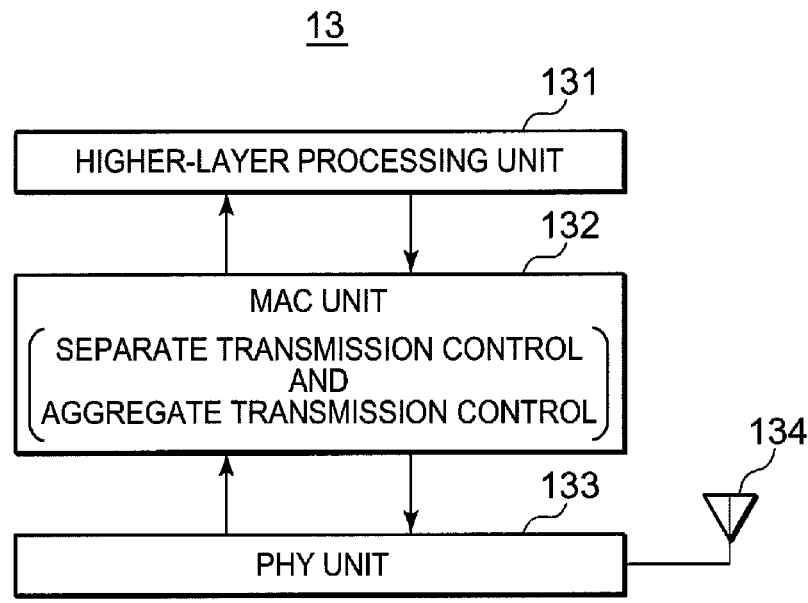
FIG. 3 is a block diagram showing an equipment configuration of a terminal included in the communication system according to the first embodiment of the present invention.

Next, configuration examples of the terminal 13 and access point 12 will be described in detail below. FIG. 3 is a functional block diagram of the terminal 13. In FIG. 3, a higher-layer processing unit 131 undertakes processes in the APP layer, the TCP layer, and the IP layer of the terminal 13 described above. A MAC unit 132 undertakes processes in the data-link layer (MAC sub-layer and LLC sub-layer) of the terminal 13 described above. A PHY unit 133 undertakes processes in the PHY layer of the terminal 13 described above. An antenna 134 is used to transmit and receive wireless signals to/from the access point 12.

Figure 4:
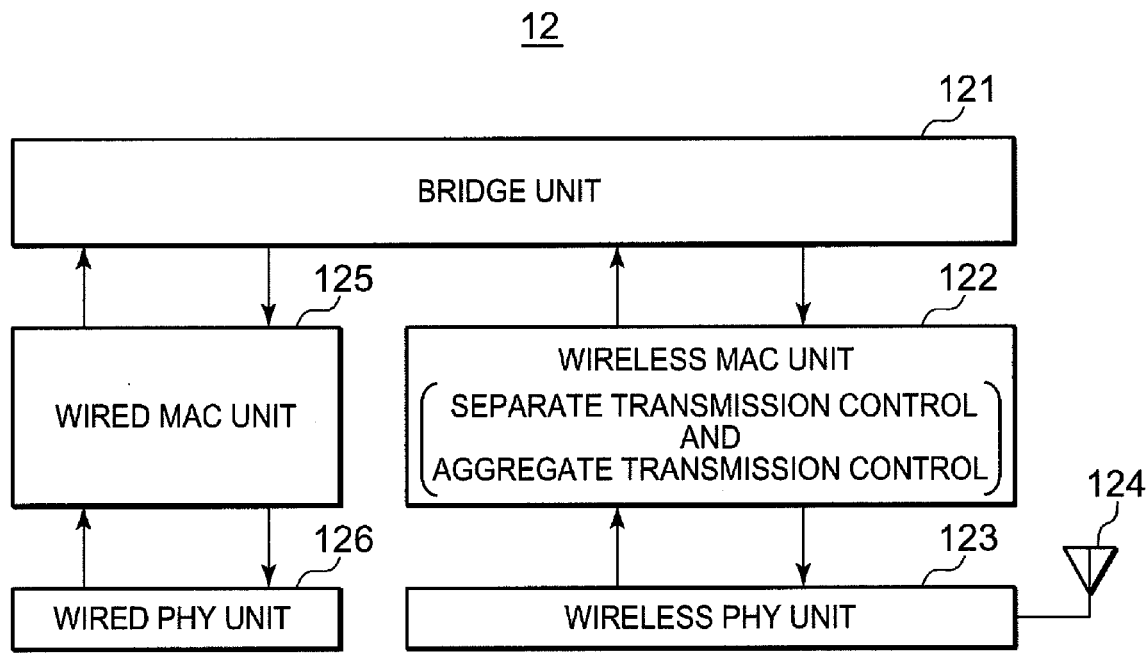
FIG. 4 is a block diagram showing an equipment configuration of an access point included in the communication system according to the first embodiment of the present invention.

FIG. 4 is a functional block diagram of the access point 12. In FIG. 4, a bridge unit 121 relays data between a wireless MAC unit 122 and a wired MAC unit 125. The wireless MAC unit 122 undertakes processes in the wireless-LAN side LLC sub-layer and the MAC sub-layer of the access point 12 described above. A wireless PHY unit 123 undertakes processes in the wireless PHY layer of the access point 12 described above. An antenna 124 is used to transmit and receive wireless signals to/from the terminal 13. A wired MAC unit 125 undertakes processes in the wired-LAN side LLC sub-layer and the wired MAC sub-layer of the access point 12 described above. A wired PHY unit 126 undertakes processes in the wired PHY layer of the access point 12 described above.

Next, description will be given of data frame transmission control procedures carried out by the MAC unit 132 of the terminal 13. FIG. 5 is a flowchart showing an example of the transmission control procedures of the MAC unit 132. In operation S11, the MAC unit 132 acquires transmit data, namely, an IP packet, from the higher-layer processing unit 131. In operation S12, the MAC unit 132 identifies the contents of the transmit data. If it is found in operation S12 that the transmit data contains feedback information for another communication apparatus such as the FTP server 11, the MAC unit 132 transmits the MAC frame containing the transmit data in its payload as a single MAC frame (hereinafter referred to as a single frame) without aggregating the MAC frame with any other MAC frame (operations S13 and S14). For example, in operation S12, the MAC unit 132 can refer to the TCP header of the TCP segment contained in the transmit data, i.e., the transmit IP packet, and if the transmit IP packet is a TCP ACK packet, the MAC unit 132 can transmit the MAC frame containing the IP packet to the PHY unit 133 without aggregating the MAC frame with any other MAC frame.

On the other hand, if it is found in operation S12 that the transmit data does not contain feedback information for another communication apparatus such as the FTP server 11, the MAC unit 132 transmits the MAC frame containing the transmit data in its payload as an aggregated MAC frame by aggregating the MAC frame with another MAC frame (operations S13 and S15).

Next, description will be given of an example of data transferred among the FTP server 11, access point 12, and terminal 13 when the communication system 1 according to the present embodiment performs file transfers between the FTP server 11 and the terminal 13 using the FTP protocol. FIG. 6 is a timing chart showing an example of data transfer among the FTP server 11, the access point 12, and the terminal 13. More specifically, FIG. 6A shows how subsequent TCP ACK packets from the terminal 13 are transmitted without aggregation if the TCP sequence numbers of transmit or receive TCP segments monitored on the terminal 13 indicate that an abnormal condition such as packet loss or delay has occurred between the FTP server 11 and the terminal 13. The IP layer, the LLC sub-layer, and the PHY layer are omitted in FIG. 6A for the sake of simplicity.

Transmit data 501 sent from the FTP server 11 to the terminal 13 is sent to the access point 12 via a wired LAN (the communication cable 14) after a TCP header is added in the TCP layer of the FTP server 11 (TCP segment 502), an IP header directed to the IP address of the terminal 13 is added in the IP layer (not shown), and a MAC header is added in the MAC sub-layer (MAC frame 503). Upon receiving the MAC frame 503, the access point 12 aggregates the received MAC frame 503 with other transmit MAC frames to generate an aggregated frame 504. Then, the access point 12 transmits the aggregated frame 504 to the terminal 13. Upon receiving the aggregated frame 504, the terminal 13 breaks down the received aggregated frame 504 in the MAC sub-layer (MAC unit 132) and thereby takes out the constituent MAC frames 505. Subsequently, the headers corresponding to the respective protocols are removed in the MAC sub-layer, the IP layer, and the TCP layer of the terminal 13, and consequently transmit data 506 (corresponding to the transmit data 501) of the FTP server 11 is passed to the APP layer (FTP).

When passing the TCP segment 506 to the APP layer (FTP), the TCP layer of the terminal 13 generates a TCP ACK segment 508 corresponding to the TCP segment 506. If something is abnormal about the TCP sequence numbers, the MAC sub-layer (MAC unit 132) of the terminal 13 checks whether the IP packet received from the higher layer is a TCP ACK packet containing the TCP ACK segment 508. If a TCP ACK packet containing the TCP ACK segment 508 is detected, the MAC sub-layer transmits the TCP ACK packet as a single MAC frame 509 without aggregation. The MAC frame 509 is relayed by the access point 12 and sent to the FTP server 11, and eventually a TCP ACK segment 510 (corresponding to the TCP ACK segment 508) arrives at the FTP server 11.

When MAC frames 511 and 512 containing a TCP ACK packet are transmitted after the MAC frame 509 containing a TCP ACK packet, the abnormal condition of the sequence numbers has been corrected. Consequently the MAC frames 511 and 512 are transmitted as an aggregated frame.

Figure 6B:
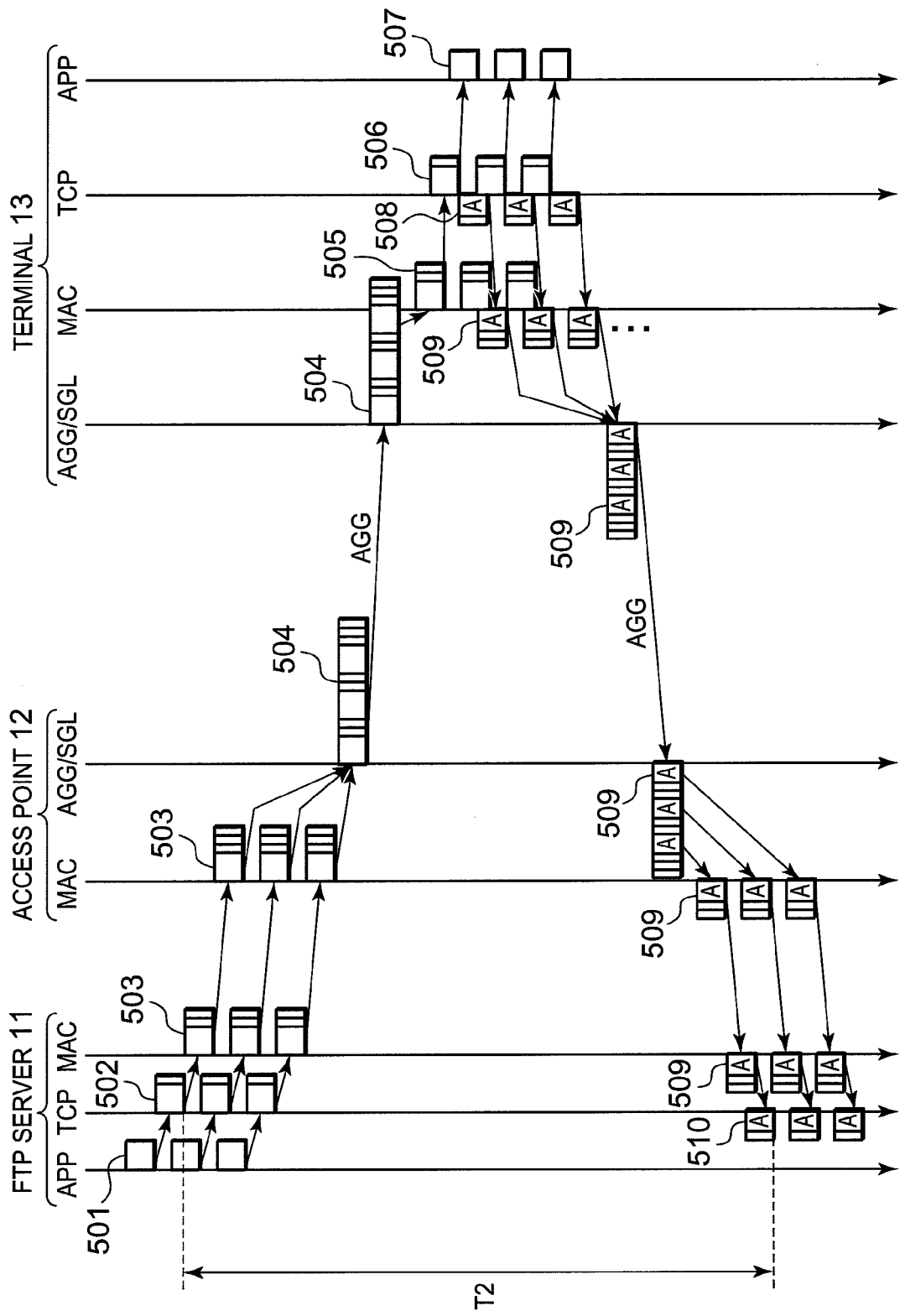
FIG. 6B is a timing chart for comparison with data transfer shown in FIG. 11A.
Figure 10A:
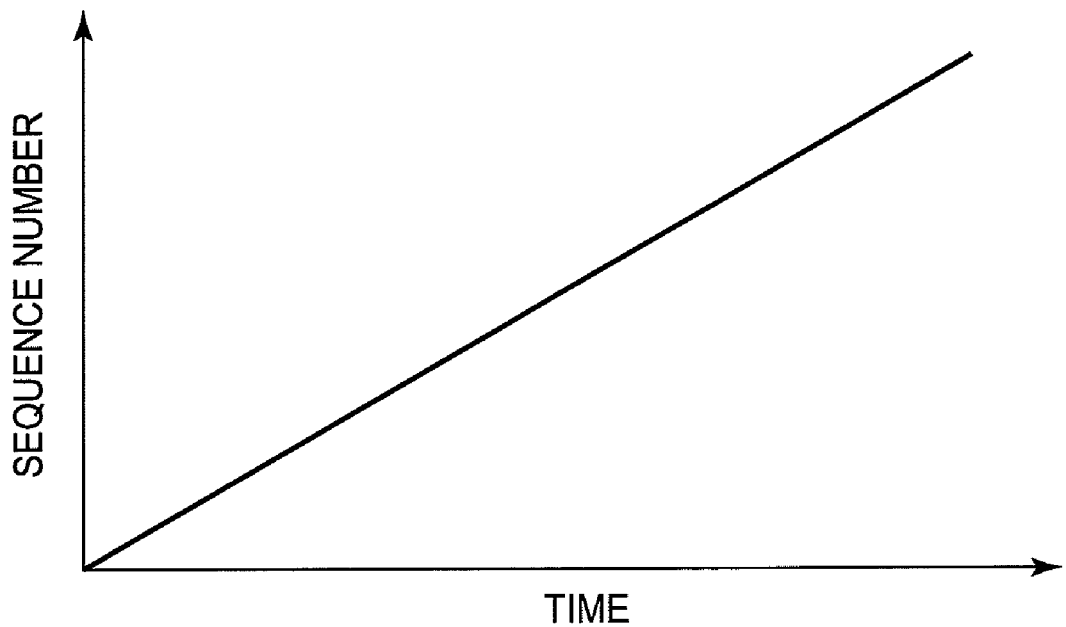
FIG. 10A is a graph showing a relationship between communication time and sequence numbers of TCP transmit segments, in a case in which a change in a rate per time of the sequence numbers is normal.
Figure 10B:
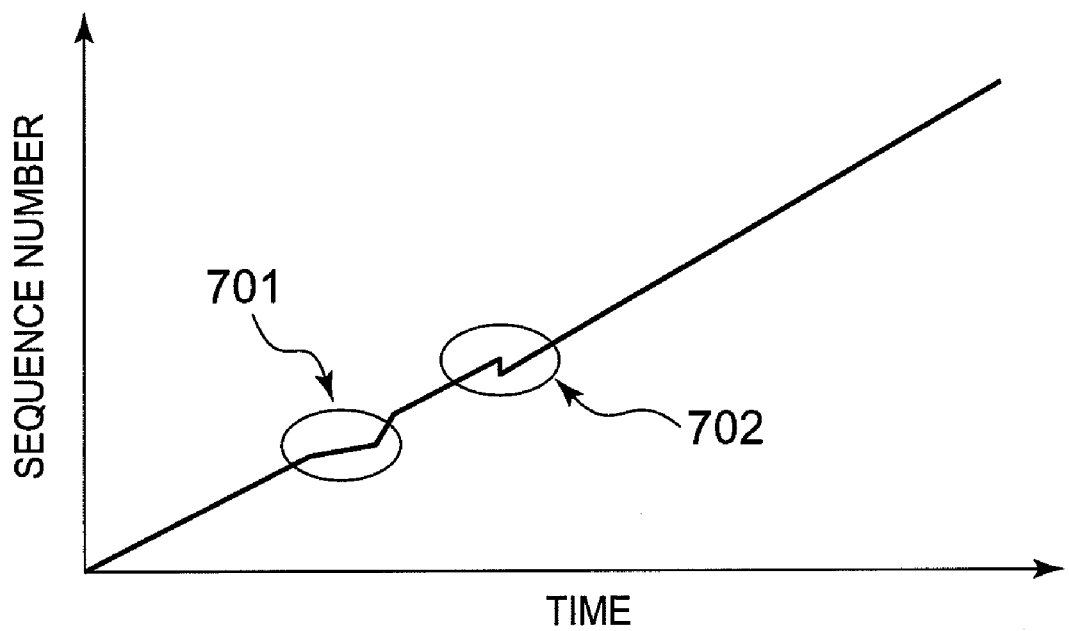
FIG. 10B is a graph showing a relationship between communication time and sequence numbers of TCP transmit segments, in a case in which a change in a rate per time of the sequence numbers is abnormal.

In contrast to FIG. 6A, FIG. 6B shows a timing chart when the MAC frame containing the TCP ACK packet described above is not transmitted separately. In a data transfer process shown in FIG. 6B, the MAC frames 509 containing the TCP ACK segment 508 are transmitted as an aggregated frame 519 by being aggregated with each other. The access point 12 breaks down the received aggregated frame 519, takes out the MAC frames 509 containing the TCP ACK packet, and transmits the MAC frames 509 to the FTP server 11. Consequently, the time T2 required for the FTP server to receive the TCP ACK segment 510 after transmitting the TCP segment 502 in the data transfer process shown in FIG. 10B is longer than the time T1 required for the FTP server 11 to receive the TCP ACK segment 510 after transmitting the TCP segment 502 in the data transfer process shown in FIG. 6A. In other words, the communication system 1 according to the present embodiment reduces the delay in arrival of the TCP ACK segment caused by frame aggregation in lower layers. This makes it possible to quickly release a TCP transmission window of the FTP server 11 to get ready to transmit a next TCP segment.

As described above, in the use of a communication method that transmits MAC frames in aggregate form in the MAC sub-layer and thereby improves transfer efficiency of the MAC frames, when the transmit data contained in the payload of an MAC frame is a TCP ACK packet or other feedback information addressed to another communication apparatus, the communication system 1 transmits the MAC frame containing the TCP ACK packet as a single frame without aggregating the MAC frame with any other MAC frame. This makes it possible to return the TCP ACK segment quickly to the other communication apparatus, which increases the TCP transmission window quickly and thereby improves the average TCP throughput.

Next, regarding the MAC unit 132 of the terminal 13, examples of its configuration and operation will be described below.

FIRST EXAMPLE

Hereinafter, a first example is described with reference to FIG. 7, FIG. 8, FIG. 9, FIG. 10, FIG. 11A, and FIG. 11B. The MAC unit 132 according to the first example is configured to selectively transmit a MAC frame containing a TCP ACK packet without aggregating it with any other MAC frame when packet loss or delay is detected between the other communication apparatus, i.e., the FTP server 11, and the terminal 13. Furthermore, the MAC unit 132 according to the first example is configured to detect packet loss or delay by monitoring the sequence numbers of the TCP segments transmitted from the terminal 13.

FIG. 7 is a block diagram of the MAC unit 132 according to the first example. In FIG. 7, a receive frame terminating unit 401 stores data received and modulated by the PHY unit 133. Also, the receive frame terminating unit 401 removes the MAC header added to the MAC frame in the wireless MAC layer of the sender-side access point 12. If payload data is higher-layer data, the receive frame terminating unit 401 passes the received data to the higher-layer processing unit 131. On the other hand, if the payload data of the received MAC frame is control data or the management data of the MAC layer, a control unit (not shown) of the MAC unit 132 performs processes appropriate for the control data or management data.

A transmit frame generating unit 402 receives an IP packet supplied from the higher-layer processing unit 131, generates a MAC header containing a destination MAC address corresponding to a destination IP address in the IP header, and adds the MAC header to the head of the IP packet. Also, based on instructions from a separate-transmission determining unit 407 described later, the transmit frame generating unit 402 supplies the generated MAC frame to a frame aggregating unit 403 or a single-frame transmit queue 405.

The frame aggregating unit 403 generates an aggregated frame by aggregating multiple MAC frames generated by the transmit frame generating unit 402, and stores the aggregated frame in an aggregated-frame transmit queue 404. The aggregated frames accumulated in the aggregated-frame transmit queue 404 are supplied to the PHY unit 133 when transmit timing occurs. The PHY unit 133 modulates the aggregated frames in preparation for transmission, and transmits a wireless signal.

The single-frame transmit queue 405 receives MAC frames to be transmitted as single MAC frames without aggregation with any other frame from the transmit frame generating unit 402, and stores the MAC frames until transmit timing occurs. When it is determined that the transmit timing has arrived, the single-frame transmit queue 405 supplies the stored MAC frames to the PHY unit 133. The PHY unit 133 modulates the aggregated frames in preparation for transmission, and transmits a wireless signal.

A higher-layer header acquiring unit 406 receives the IP packet supplied to the transmit frame generating unit 402, acquires the TCP header from the IP packet, and stores the sequence number by associating it with the time of acquisition.

The separate-transmission determining unit 407 monitors the sequence numbers acquired by the higher-layer header acquiring unit 406 and times of their acquisition, and calculates the change in a rate per time of the sequence numbers. Then the separate-transmission determining unit 407 checks the IP packets received from the access point 12 for any abnormal condition, such as packet loss or delay, based on variation in the change in a rate per time of the sequence numbers. If is it determined that there is an abnormal condition, such as packet loss or delay, the separate-transmission determining unit 407 gives the transmit frame generating unit 402, the frame aggregating unit 403, and a transmit queue control unit 408 instructions for separate transmission.

Based on the determination made by the separate-transmission determining unit 407 as to whether to carry out separate transmission, the transmit queue control unit 408 ensures that transmission can be carried out from an appropriate one of the single-frame transmit queue 405 and the aggregated-frame transmit queue 404 when transmit timing is acquired. For example, even if it is determined that transmission is to be carried out from the single-frame transmit queue 405, if the single-frame transmit queue 405 contains no packet to be transmitted, the transmit queue control unit 408 carries out transmission from the aggregated-frame transmit queue 404.

The maximum length of the aggregated frame generated by the frame aggregating unit 403 is determined based on the data length of the MAC frames to be aggregated and the time required for aggregation. However, if the single-frame transmit queue 405 contains no MAC frame to be transmitted separately as described above, the frame aggregating unit 403 may move up and send a frame in the process of being aggregated, even if the data contained in the payload of the MAC frame is not a TCP ACK segment, and may make the aggregated-frame transmit queue 404 transmit the frame to the single-frame transmit queue 405.

The higher-layer header acquiring unit 406 according to the first example is intended to be used to check for a TCP ACK packet by acquiring a TCP header. However, acquired packet headers are not limited to TCP headers, and the packet headers may be based on another protocol such as RTP (Real-Time Transport Protocol), as long as the packet headers contain a sequence number, a timestamp, or other information that enables checking for packet loss or delay.

The wireless MAC unit 122 of the access point 12 may be configured in the same manner as the MAC unit 132.

Figure 8:
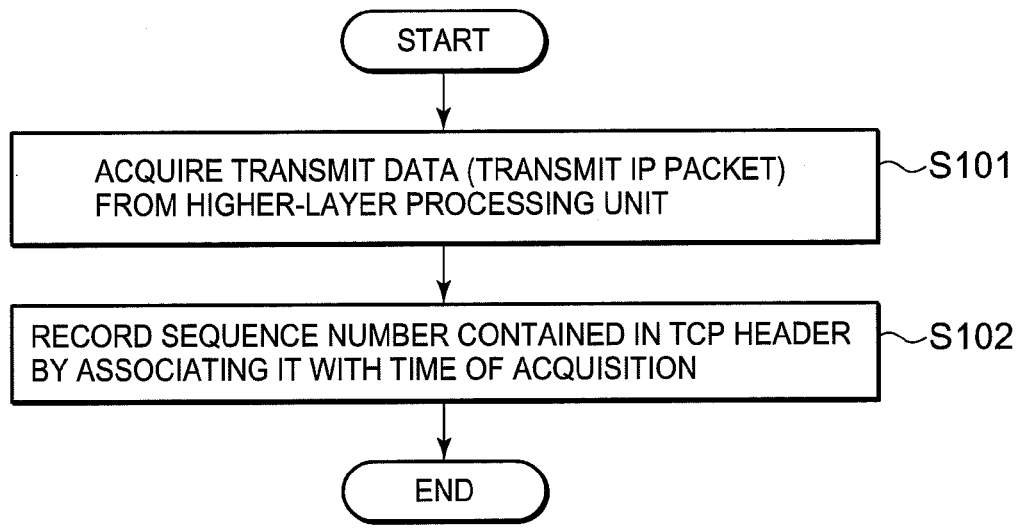
FIG. 8 is a flowchart showing operation of a higher-layer header acquiring unit of the MAC unit according to the first configuration example.
Figure 11A:
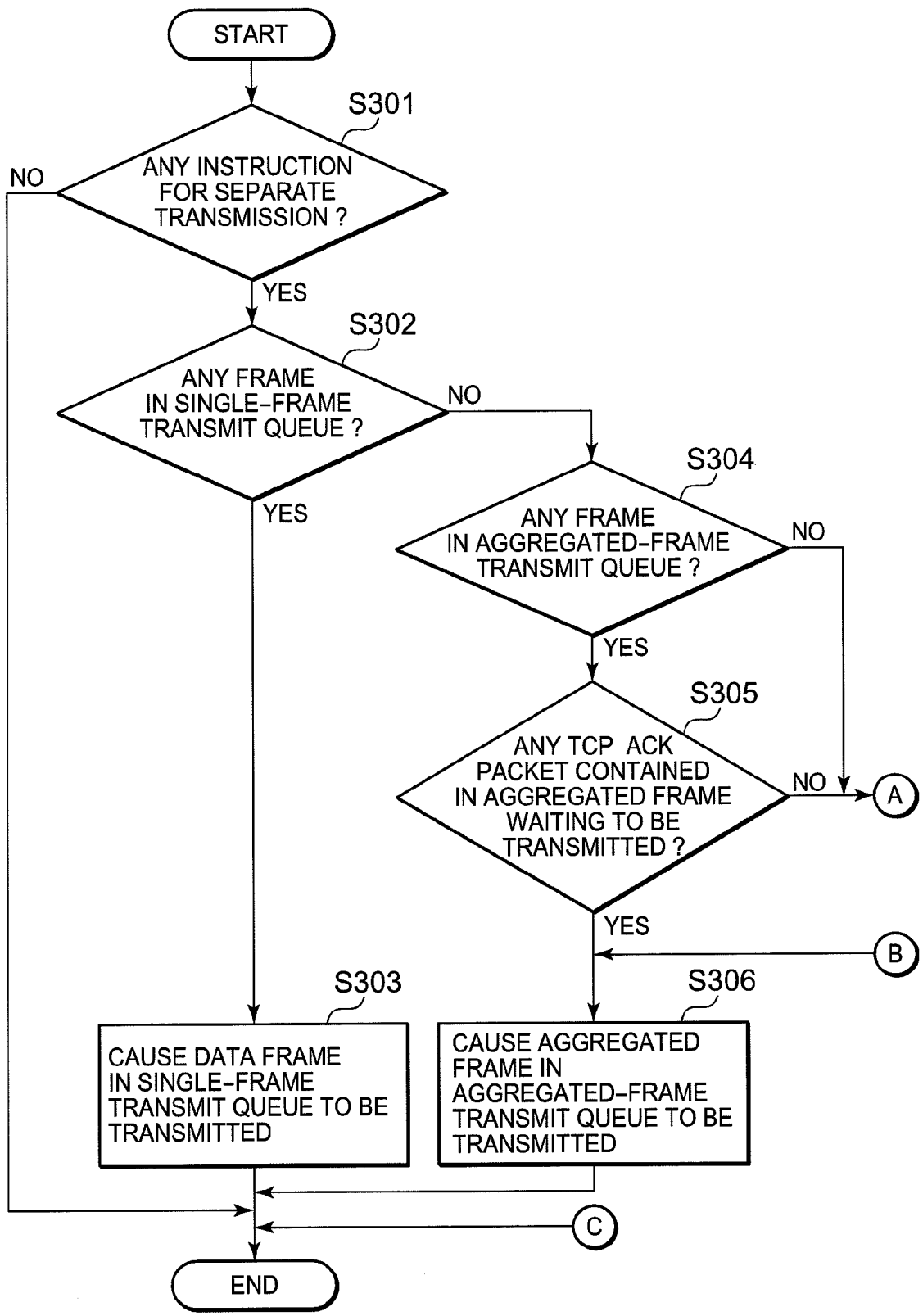
FIG. 11A is a flowchart showing a portion of operation of a transmit queue control unit of the MAC unit according to a first example.
Figure 11B:
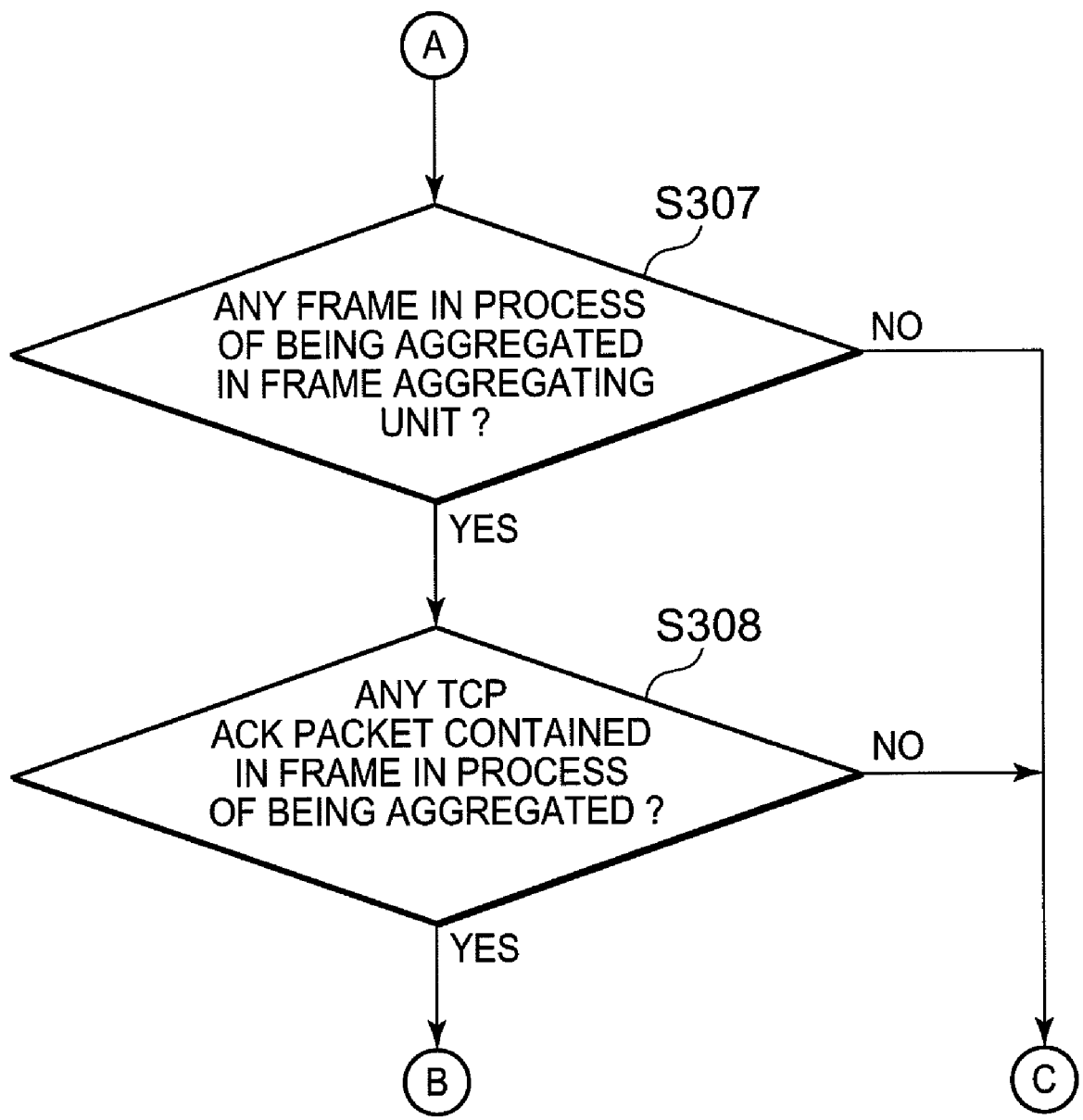
FIG. 11B is a flowchart showing another portion of the operation of the transmit queue control unit of the MAC unit according to the first example.

Next, operation of the MAC unit 132 according to the first example will be discussed in detail with reference to FIG. 8, FIG. 9, FIG. 10, FIG. 11A, and FIG. 11B. FIG. 8 shows the operation of the higher-layer header acquiring unit 406, FIG. 9 shows the operation of the separate-transmission determining unit 407, and FIG. 11A and FIG. 11B show the operation of the transmit queue control unit 408.

The higher-layer header acquiring unit 406 performs the process shown in FIG. 8 repeatedly during communication by the terminal 13. In operation S101 in FIG. 8, the higher-layer header acquiring unit 406 acquires the transmit data, i.e., the IP packet supplied from the higher-layer processing unit 131 to the transmit frame generating unit 402. In operation S102, the higher-layer header acquiring unit 406 extracts the TCP header from the IP packet, and records the sequence number contained in the TCP header by associating it with the time of acquisition.

Figure 9:
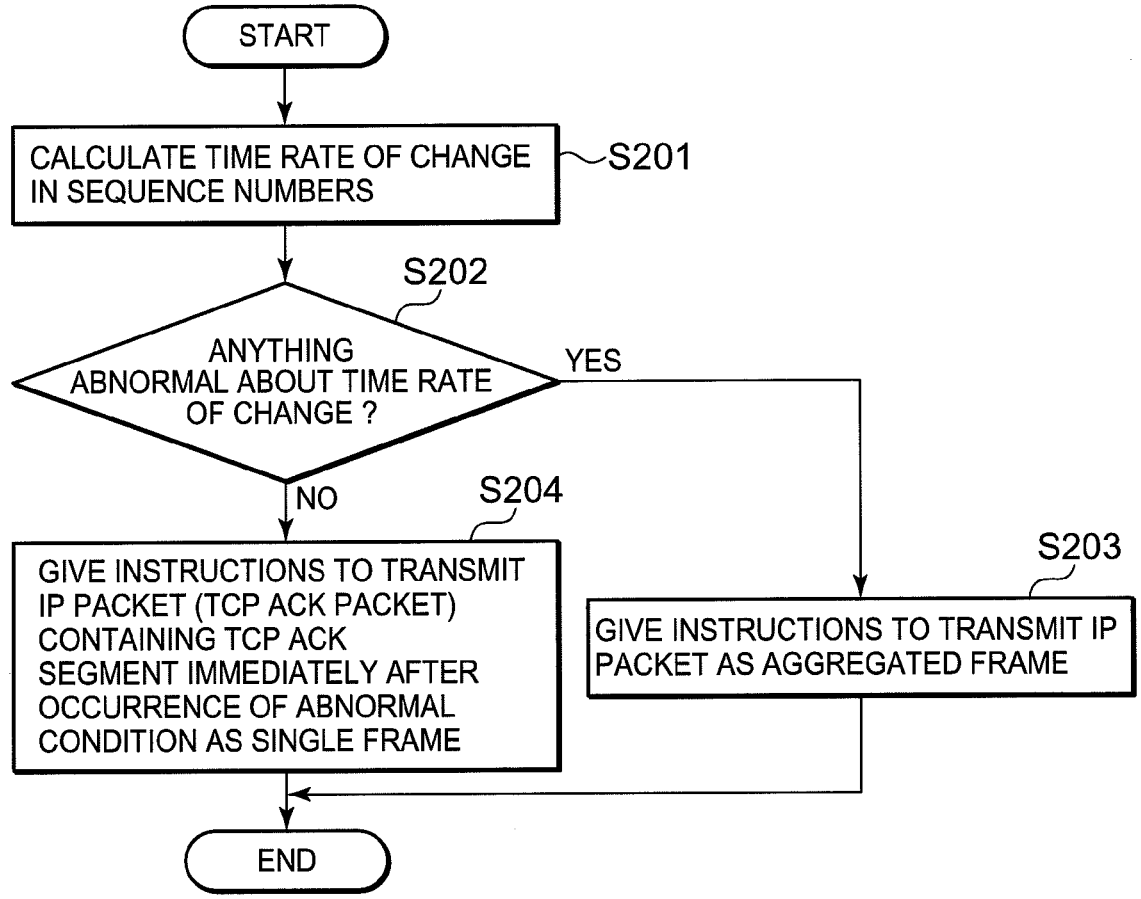
FIG. 9 is a flowchart showing operation of a separate-transmission determining unit of the MAC unit according to the first configuration example.

The separate-transmission determining unit 407 performs the process shown in FIG. 9 repeatedly during the communication by the terminal 13. In operation S201 in FIG. 9, the separate-transmission determining unit 407 calculates the change in a rate per time of the sequence numbers acquired by the higher-layer header acquiring unit 406. In operation S202, the separate-transmission determining unit 407 monitors the calculated change in a rate per time of the sequence numbers and checks its value for any abnormal variation. For example, the abnormality in the change in a rate per time of the sequence numbers may be a variation in the slope of the sequence numbers, or discontinuous changes of the sequence numbers. FIG. 10A and FIG. 10B are graphs showing an example of a time variation of the sequence numbers, where the abscissa represents time and the ordinate represents sequence number. FIG. 10A shows a case in which the change in a rate per time is constant, which is an example in which the change in a rate per time is normal. On the other hand, FIG. 10B shows a case in which there is something abnormal about the change in a rate per time. Specifically, in an area 701 enclosed with a dotted line in FIG. 10B, the change in a rate per time of the sequence numbers decreases, indicating that there was a delay in a transmitted TCP segment. On the other hand, in an area 702 enclosed with a dotted line in FIG. 10B, the sequence numbers decrease discontinuously, indicating that a TCP segment was retransmitted due to a loss of transmit data.

To continue the description by returning to FIG. 9, if it is determined in operation S202 that there is no abnormal value in the change in a rate per time of the sequence numbers, the separate-transmission determining unit 407 gives instructions to transmit the MAC frame containing the IP packet used to calculate the change in a rate per time as an aggregated frame (operation S203). In response to the instructions, the transmit frame generating unit 402 sends the MAC frame containing the IP packet that has been used to calculate the change in a rate per time to the frame aggregating unit 403, which then aggregates the MAC frame.

On the other hand, if it is determined in operation S202 that there is something abnormal about the change in a rate per time of the sequence numbers, the separate-transmission determining unit 407 gives instructions to separately transmit the IP packet containing the TCP ACK segment with the sequence number following the abnormal sequence number, without aggregation (operation S204). In response to the instructions, the transmit frame generating unit 402 sends the MAC frame containing the IP packet, which contains the TCP ACK segment with the sequence number following the abnormal sequence number, to the single-frame transmit queue 405, but not to the frame aggregating unit 403.

Next, the operation of the transmit queue control unit 408 will be discussed in detail with reference to FIG. 11A and FIG. 11B. The transmit queue control unit 408 performs the processes shown in FIG. 11A and FIG. 11B repeatedly during the communication by the terminal 13.

The transmit queue control unit 408 accepts instructions for separate transmission as input from the separate-transmission determining unit 407, and selects one of the single-frame transmit queue 405 and the aggregated-frame transmit queue 404 as a transmit queue used to supply transmit data frames to the PHY unit 132 when the transmit timing arrives.

In operation S301, if there are not instructions for separate transmission from the separate-transmission determining unit 407, the transmit queue control unit 408 finishes the processes in FIG. 11A and FIG. 11B. When the next execution timing arrives, the transmit queue control unit 408 returns to operation S301 and executes the operation again. On the other hand, if there are instructions for separate transmission from the separate-transmission determining unit 407 (YES in operation S301), the transmit queue control unit 408 determines whether there is a MAC frame in the single-frame transmit queue 405 (operation S302). If there is a MAC frame in the single-frame transmit queue 405, the transmit queue control unit 408 causes the data frame to be transmitted (operation S303). If there are two or more MAC frames in the single-frame transmit queue 405, the transmit queue control unit 408 may cause only the first MAC frame to be transmitted, or all of the MAC frames accumulated in the single-frame transmit queue 405 to be transmitted in sequence.

If it is found in operation S302 that there is no MAC frame in the single-frame transmit queue 405 waiting to be transmitted (NO in operation S302), the transmit queue control unit 408 checks whether there is an aggregated frame yet to be transmitted in the aggregated-frame transmit queue 404 (operation S304).

If it is found in operation S304 that there is an aggregated frame yet to be transmitted in the aggregated-frame transmit queue 404 (YES in operation S304), the transmit queue control unit 408 checks whether the aggregated frame yet to be transmitted contains a TCP ACK packet (operation S305).

If it is determined in operation S305 that there is a TCP ACK packet, the transmit queue control unit 408 causes the aggregated frame containing the TCP ACK packet to be transmitted (operation S306). The transmit queue control unit 408 may extract the MAC frame containing the TCP ACK packet from the aggregated-frame transmit queue 404 and cause the MAC frame to be transmitted alone.

If it is found in operation S304 that there is no aggregated frame yet to be transmitted in the aggregated-frame transmit queue 404 (NO in operation S304), the transmit queue control unit 408 checks whether the frame aggregating unit 403 is in the process of generating an aggregated frame (operation S307).

If the frame aggregating unit 403 is in the process of frame aggregation (YES in operation S307), the transmit queue control unit 408 checks whether the frames in the process of being aggregated contain a TCP ACK packet (operation S308).

If there is a TCP ACK packet (YES in operation S308), the transmit queue control unit 408 instructs the frame aggregating unit 403 to stop the frame aggregation immediately, and, to output the frames in the process of being aggregated to the aggregated-frame transmit queue 404 (operation S306). The transmit queue control unit 408 may make the frame aggregating unit 403 extract only the MAC frame containing the TCP ACK packet from the frames in the process of being aggregated, and output the MAC frame to the aggregated-frame transmit queue 404.

As described above, in the use of a communication method that transmits MAC frames in aggregate form in the MAC sub-layer and thereby improves transfer efficiency of the MAC frames, the MAC unit 132 according to the first example transmits a MAC frame containing a TCP ACK packet as a single MAC frame without aggregating it with any other MAC frame when a loss or delay of TCP segments is detected. Consequently, the TCP ACK segment can be returned quickly to the sender apparatus under conditions in which congestion control is expected to be performed by the other communication apparatus (FTP server 11) due to the loss or delay of TCP segments. This makes it possible to quickly increase the TCP transmission window of the sender, i.e., the other communication apparatus (FTP server 11), and thereby improve average TCP throughput.

SECOND EXAMPLE

Hereinafter, a second example is described in reference to FIG. 12 and FIG. 13. As in the case of the first example described above, the MAC unit 132 according to the second example is configured to selectively transmit a MAC frame containing a TCP ACK packet without aggregating it with any other MAC frame when packet loss or delay is detected between the other communication apparatus, i.e., the FTP server 11, and the terminal 13. The second example differs from the first example in that whereas the MAC unit 132 according to the first example monitors the sequence numbers of transmit TCP segments, the MAC unit 132 according to the second example monitors the sequence numbers of receive TCP segments from the other communication apparatus.

Figure 12:
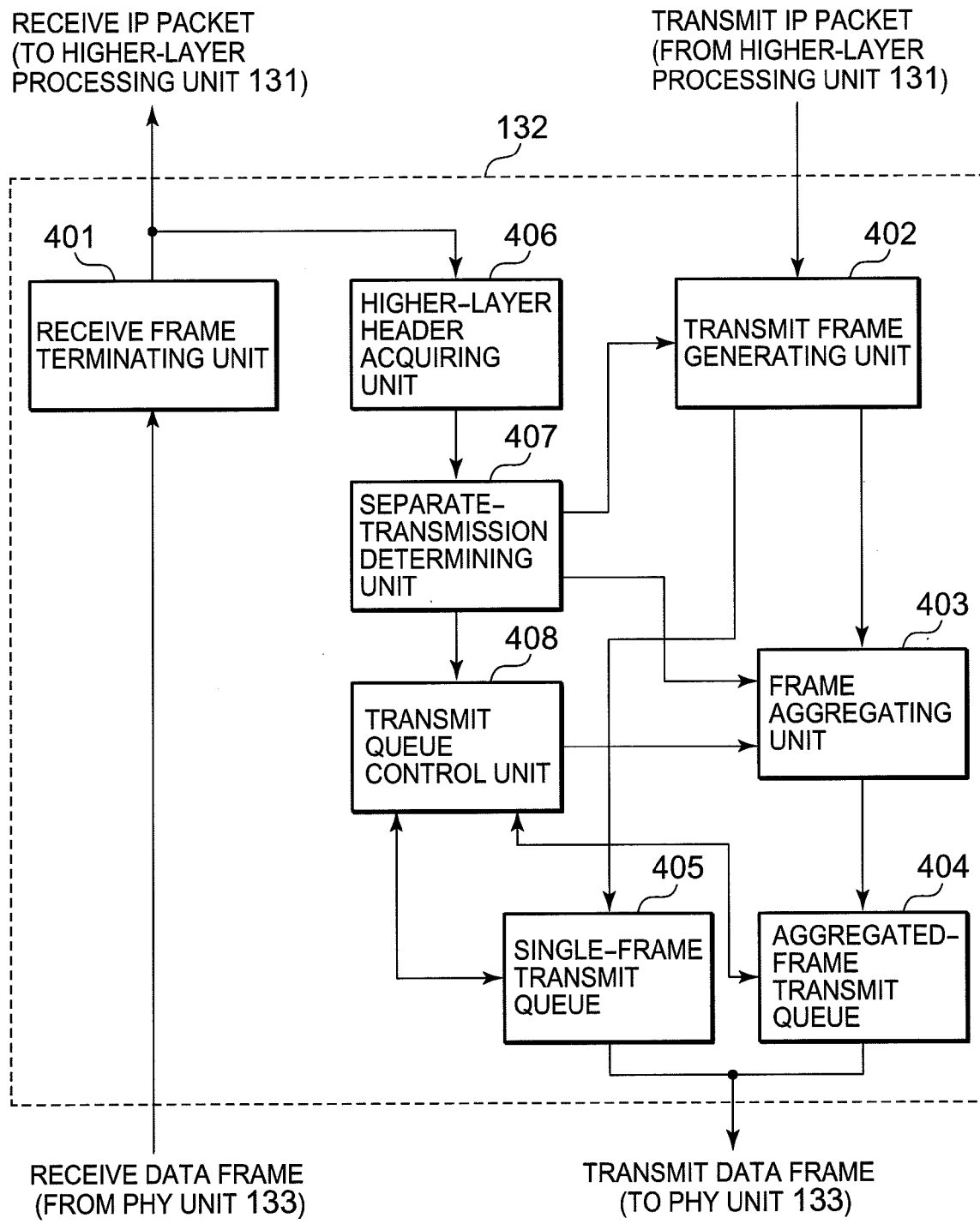
FIG. 12 is a block diagram showing a second example of the MAC unit of the terminal included in the communication system according to the first embodiment of the present invention.
Figure 13:
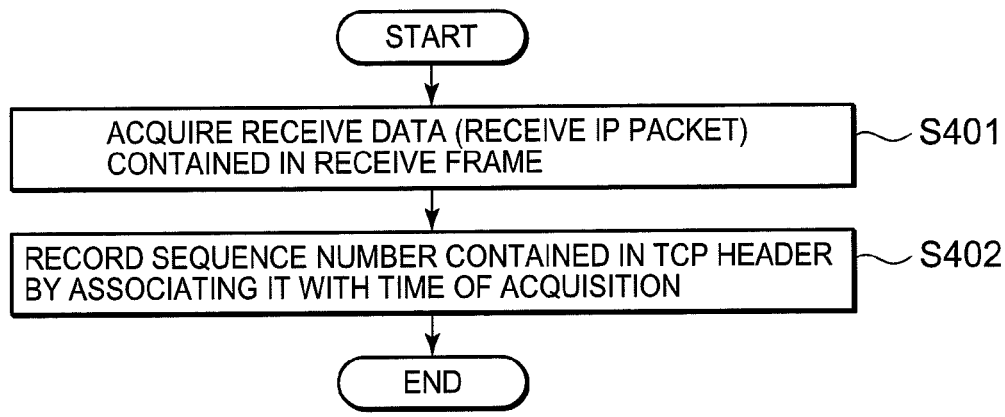
FIG. 13 is a flowchart showing operation of a higher-layer header acquiring unit of the MAC unit according to the second example.

FIG. 12 is a block diagram of the MAC unit 132 according to the second example. FIG. 12 differs from the block diagram in FIG. 7 in that the higher-layer header acquiring unit 406 acquires a receive IP packet outputted from the receive frame terminating unit 401. FIG. 13 is a flowchart showing operation procedures of the higher-layer header acquiring unit 406 in FIG. 12. As shown in FIG. 13, the higher-layer header acquiring unit 406 according to the second example acquires the receive IP packet contained in the receive MAC frame (operation S401), extracts the TCP header from the receive IP packet, and records the sequence number contained in the TCP header by associating it with the time of acquisition (operation S402). Functions and operation of the components other than the higher-layer header acquiring unit 406 are the same as those shown in FIG. 7, and thus a detailed description thereof will be omitted.

The terminal 13 equipped with the MAC unit 132 according to the second example can also quickly return the TCP ACK segment to the sender apparatus under conditions in which congestion control is expected to be performed by the other communication apparatus (FTP server 11) due to the loss or delay of TCP segments. This makes it possible to quickly increase the TCP transmission window of the sender, i.e., the other communication apparatus (FTP server 11), and thereby improve the average TCP throughput.

THIRD EXAMPLE

Hereinafter, a third example is described in reference to FIG. 14. The MAC unit 132 according to the first and second examples selectively transmits a TCP ACK packet as a single frame in case of loss or delay of TCP segments, and transmits the TCP ACK packet in aggregate form under normal operating conditions. However, this is only an example, and the TCP ACK packet may always be transmitted as a single frame. Such a configuration is useful in a communication form in which amounts of inbound and outbound data transfers are asymmetrical, such as when the terminal 13 receives stream data such as voice or video, and transmits an ACK packet to the other communication apparatus, i.e., the sender of the stream data, indicating completion of data reception.

Figure 14:
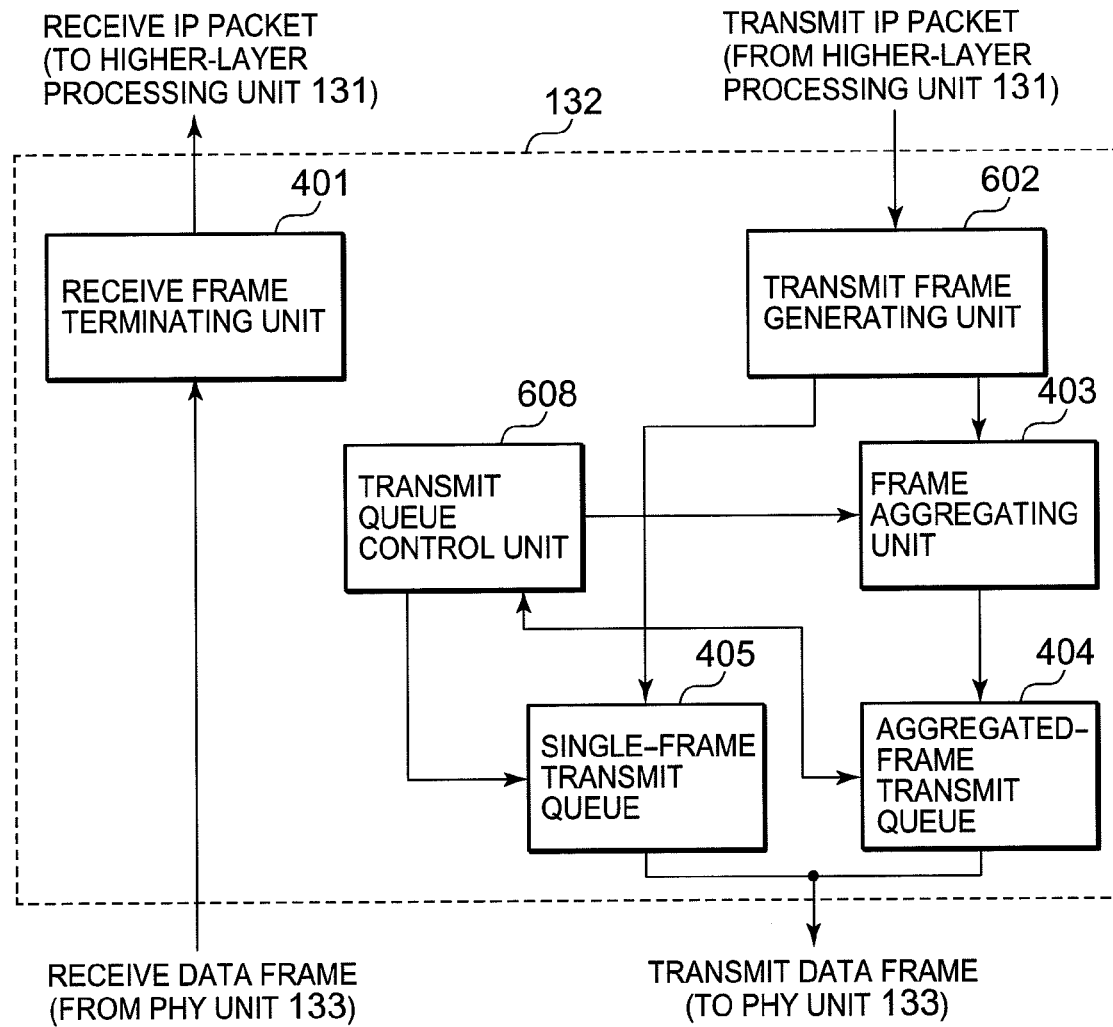
FIG. 14 is a block diagram showing a third example of the MAC unit of the terminal included in the communication system according to the first embodiment of the present invention.

A configuration example of the MAC unit 132 according to the third example is shown in FIG. 14. FIG. 14 differs from the block diagram in FIG. 7 in that the higher-layer header acquiring unit 406 and the separate-transmission determining unit 407 that detect packet loss or delay and determine whether or not to aggregate MAC frames are omitted. A transmit frame generating unit 602 in FIG. 14 can store the MAC frame containing a TCP ACK packet in the single-frame transmit queue 405, regardless of whether instructions for separate transmission are issued by the separate-transmission determining unit 407. Also, a transmit queue control unit 608 can control the single-frame transmit queue 405 and the aggregated-frame transmit queue 404 so that the MAC frame containing a TCP ACK packet will be transmitted preferentially, regardless of whether instructions for separate transmission are issued by the separate-transmission determining unit 407. Specifically, the transmit queue control unit 608 can repeatedly execute the processes of operations S302 to S308 excluding operation S301 in the flowchart shown in FIG. 11A and FIG. 11B.

FOURTH EXAMPLE

Figure 15:
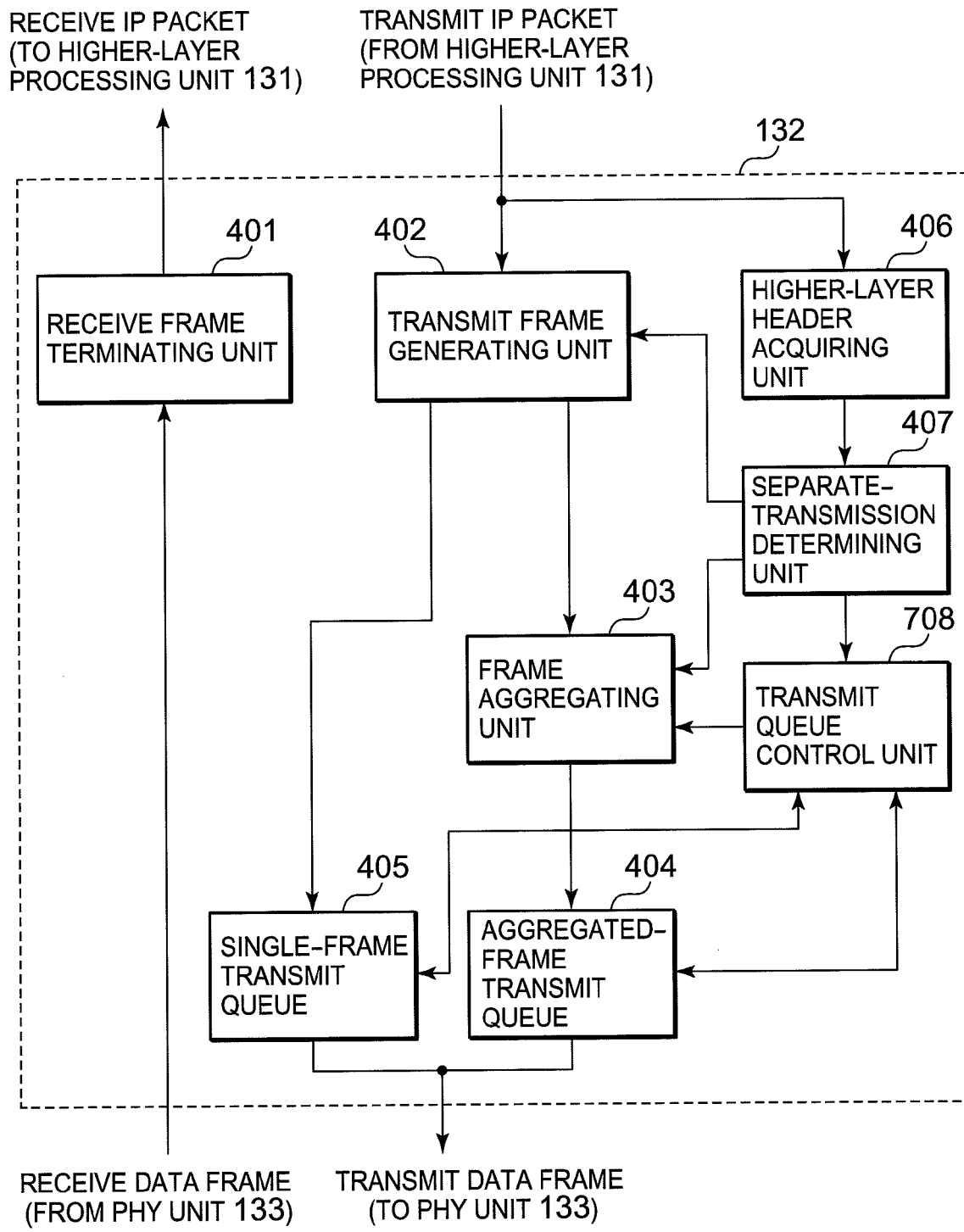
FIG. 15 is a block diagram showing a fourth example of the MAC unit of the terminal included in the communication system according to the first embodiment of the present invention.

Hereinafter, a fourth example is described in reference to FIG. 15 and FIG. 16. The MAC unit 132 according to the fourth example results from alterations in the operation of the transmit queue control unit 408 of the MAC unit 132 according to the first example. In case of an abnormal condition such as a packet loss or delay, a transmit queue control unit 708 of the MAC unit 132 according to the fourth example transmits the MAC frame containing a TCP ACK packet using the aggregated-frame transmit queue 404 or single-frame transmit queue 405, for whichever a transmit timing arrives earlier.

Figure 16:
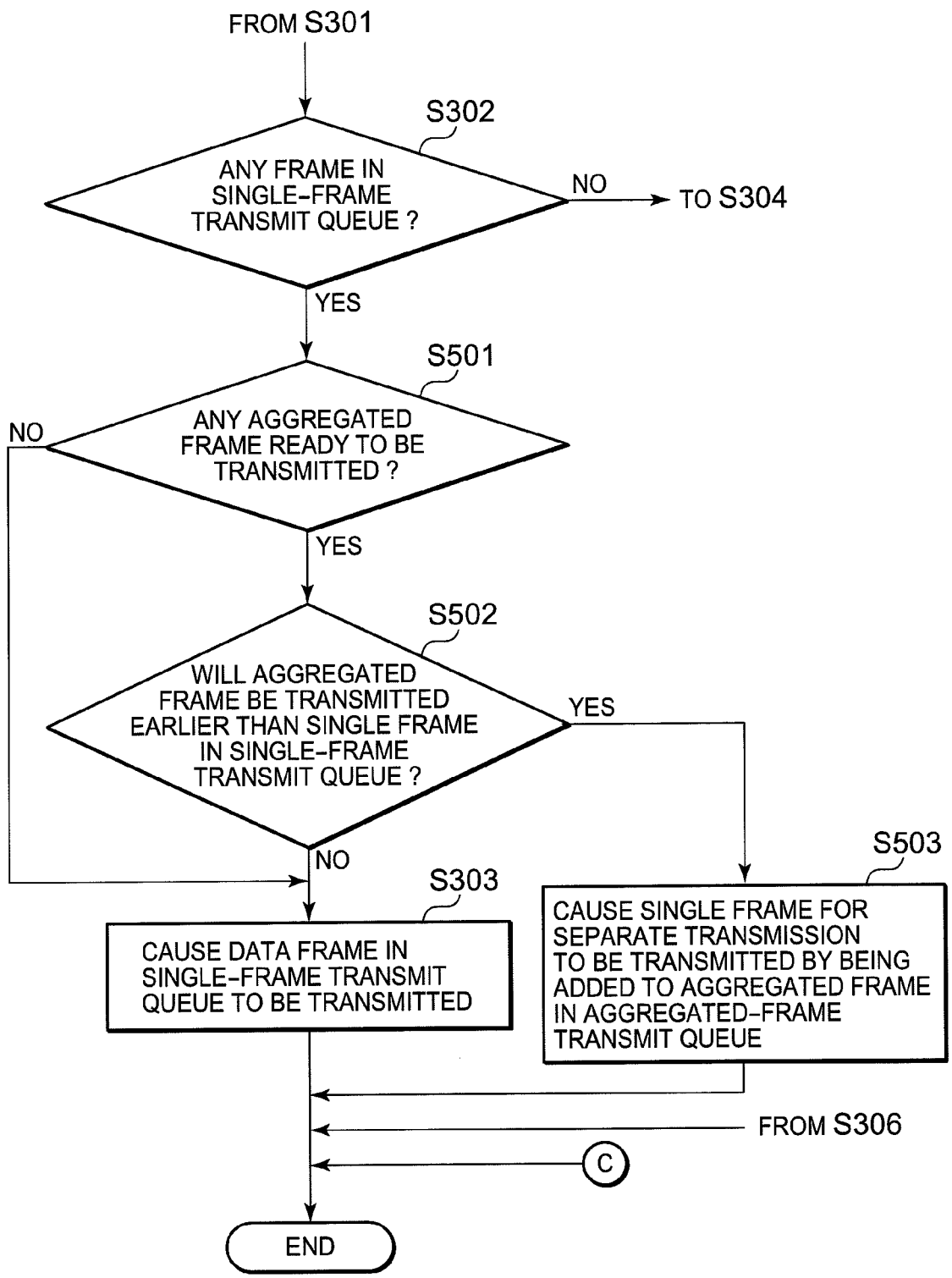
FIG. 16 is a flowchart showing operation of a transmit queue control unit of the MAC unit according to the fourth example.

For example, the transmit queue control unit 708 can carry out the processes of operations S501 to S503 shown in FIG. 16 between operations S302 and S303 in the flowchart shown in FIG. 11A and FIG. 11B. If it is determined in operation S302 that there is a MAC frame in the single-frame transmit queue 405, the transmit queue control unit 708 determines in operation S501 whether there is any aggregated frame ready to be transmitted in the aggregated-frame transmit queue 404. If there is no aggregated frame ready to be transmitted in the aggregated-frame transmit queue 404 (NO in operation S501), the transmit queue control unit 708 goes to S303 and causes a MAC frame containing a TCP ACK packet to be transmitted from the single-frame transmit queue 405 when a transmit timing arrives for the single-frame transmit queue 405.

On the other hand, if there is an aggregated frame ready to be transmitted in the aggregated-frame transmit queue 404 (YES in operation S501), the transmit queue control unit 708 determines whether the aggregated frame in the aggregated-frame transmit queue 404 will be transmitted earlier than a single frame in the single-frame transmit queue 405 (operation S502). If it is determined that the aggregated frame in the aggregated-frame transmit queue 404 will be transmitted earlier (YES in operation S502), the transmit queue control unit 708 causes the MAC frame for separate transmission to be transmitted by being added to the aggregated frame in the aggregated-frame transmit queue 404 (operation S503).

If a MAC frame containing feedback information (specifically, a TCP ACK packet) can be transmitted as an aggregated frame earlier than as a single frame, the MAC unit 132 according to the fourth example transmits the MAC frame as an aggregated frame rather than as a single frame. That is, the terminal equipped with the MAC unit 132 according to the fourth example can transmit the MAC frame containing feedback information for the other communication terminal as soon as possible.

FIFTH EXAMPLE

Figure 17:
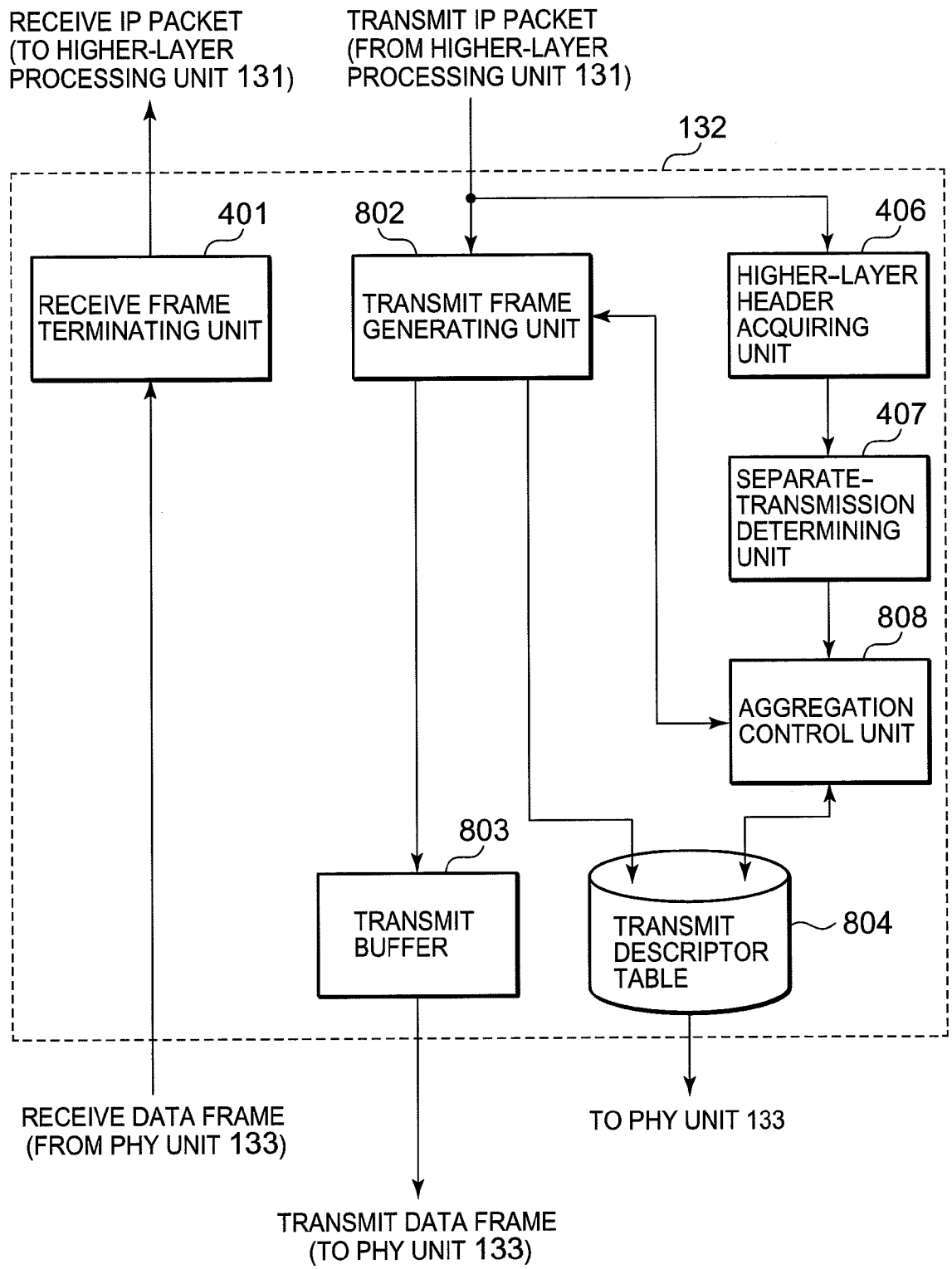
FIG. 17 is a block diagram showing a fifth example of the MAC unit of the terminal included in the communication system according to the first embodiment of the present invention.

Hereinafter, a fifth example is described in reference to FIG. 17, FIG. 18A, and FIG. 18B. A configuration of the MAC unit 132 according to the fifth example is shown in FIG. 17. In FIG. 17, a transmit frame generating unit 802 generates transmit MAC frames and stores them in a transmit buffer 803, and generates a transmit descriptor table 804. The transmit descriptor table 804 contains a plurality of transmit descriptors. Each of the transmit descriptors describes an address in the transmit buffer 803 that stores the transmit MAC frames.

The PHY unit 133 that operates in cooperation with the MAC unit 132 according to the fifth example has a DMA (Direct Memory Access) controller function. The PHY unit 133 reads transmit MAC frames out of the transmit buffer 803 based on the transmit descriptor table 804, and transmits them as aggregated frames or single frames.

Figure 18A:
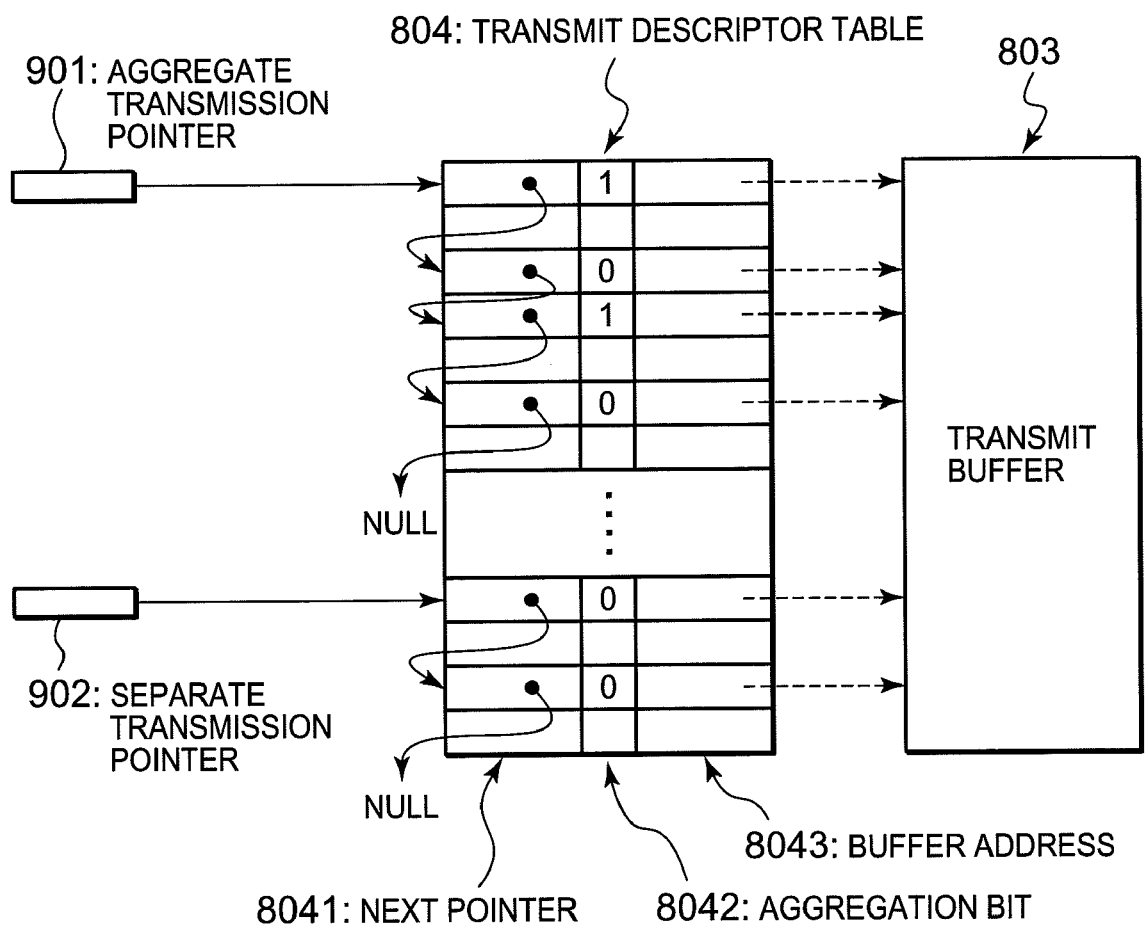
FIG. 18A is a diagram showing an example of a transmit descriptor table to explain an operation performed by an aggregation control unit of the MAC unit according to the fifth example.

An example of the transmit descriptor table 804 is shown in FIG. 18A. In the example of FIG. 18A, each transmit descriptor contains a NEXT pointer 8051 that specifies the next descriptor, an aggregation bit 8042 that indicates whether or not this MAC frame will be aggregated with a MAC frame specified by the next descriptor, and an address (buffer address 8043) of the transmit buffer 803 which stores this MAC frame.

In the example of FIG. 18A, the aggregation bit 8042 is 1-bit information. When this bit has a value of 1, there will be "aggregation," and when the bit has a value of 0, there will be "no aggregation". The value 0 of the aggregation bit 8042 is also used to specify the rearmost MAC frame among a plurality of MAC frames to be aggregated. For example, when two MAC frames are aggregated, the aggregation bit 8042 in the transmit descriptor for the first MAC frame has a value of 1. On the other hand, the aggregation bit 8042 in the second descriptor pointed to by the NEXT pointer 8041 in the transmit descriptor for the first MAC frame has a value of 0.

Also, in the example of FIG. 18A, the address of the first transmit descriptor needed to generate an aggregated frame is specified by using an aggregate transmission pointer 901. Similarly, the address of the first transmit descriptor needed to generate a single frame is specified by using a separate transmission pointer 902.

In relation to the use of a transmit descriptor table 804 such as that shown in FIG. 17 and FIG. 18A, to notify the PHY unit 133 about storage addresses of transmit MAC frames and about whether or not there will be aggregation, the process in which the MAC unit 132 according to the fourth example adds a single frame to an aggregated frame can be implemented easily.

An aggregation control unit 808 shown in FIG. 17 adds a MAC frame specified as a single frame to an aggregated frame by rewriting the transmit descriptor table 804. An exemplary operation of the aggregation control unit 808 will be described with reference to FIG. 18B. FIG. 18B shows an example in which a MAC frame specified as a single frame is added to an aggregated frame by exchanging the NEXT pointers 8041 and rewriting the aggregation bits 8042.

Figure 18B:
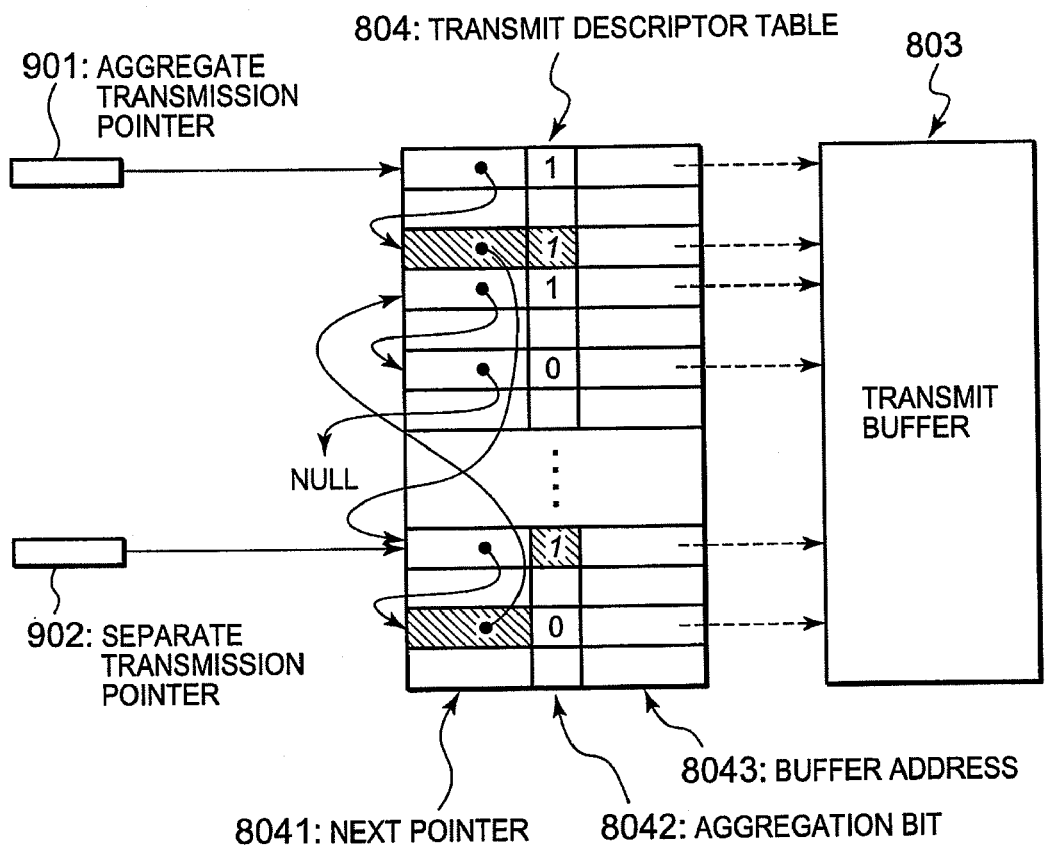
FIG. 18B is a diagram showing another example of a transmit descriptor table to explain another operation performed by the aggregation control unit of the MAC unit according to the fifth example.
Figure 19:
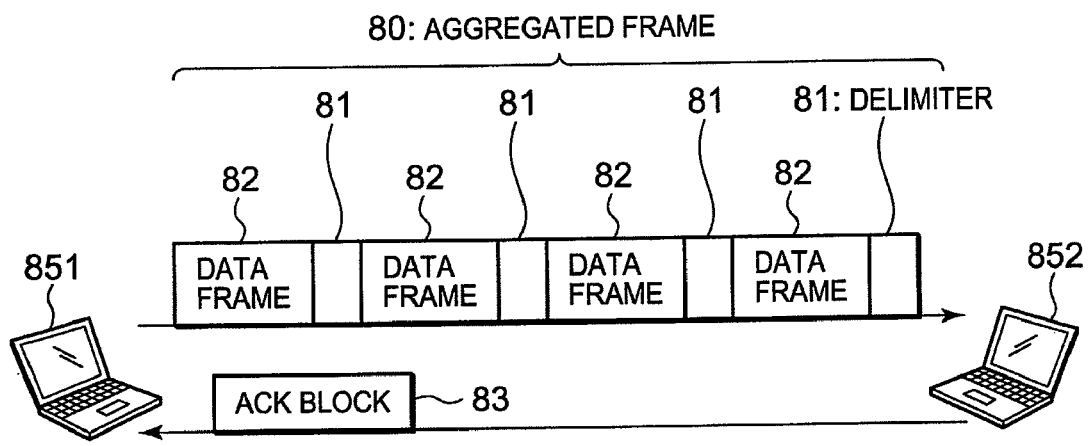
FIG. 19 is a diagram schematically showing an example of a frame aggregation technique according to a related art.
Figure 20:
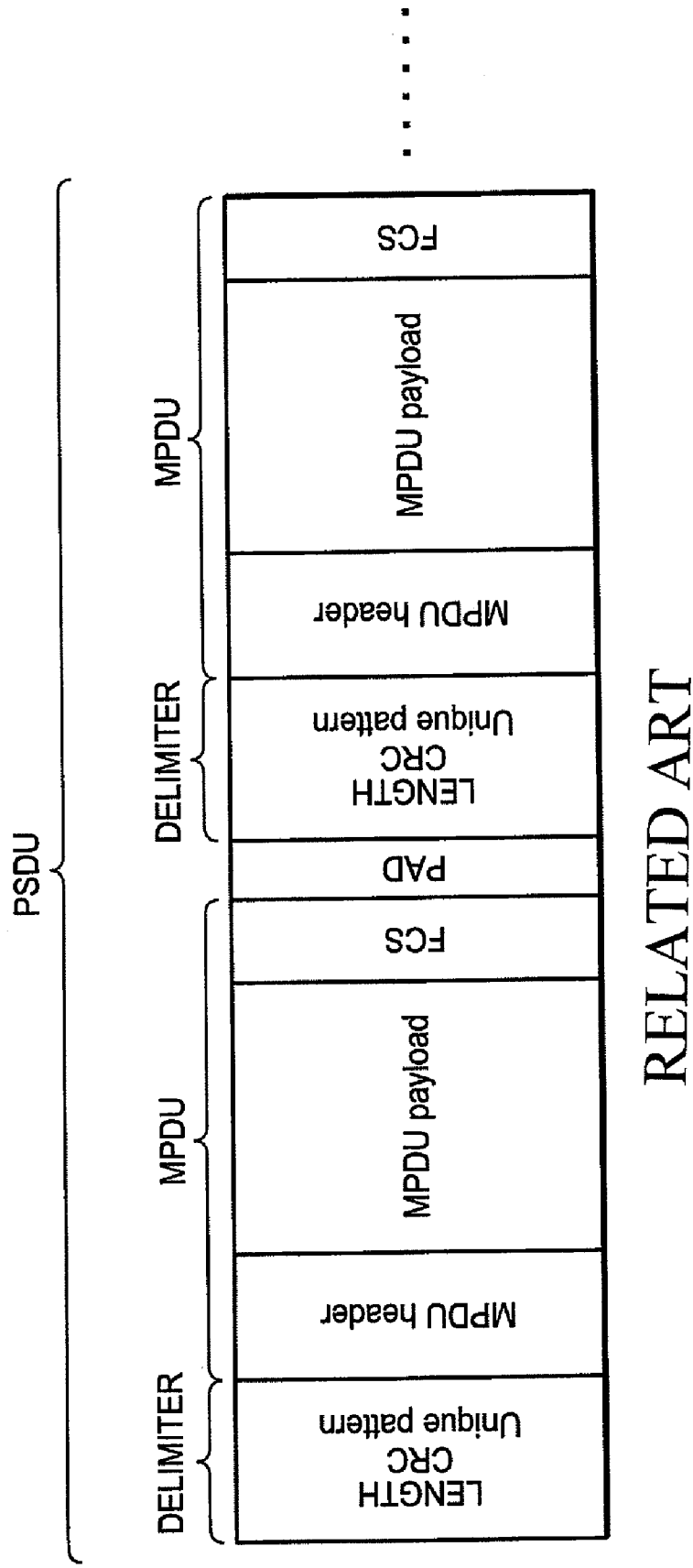
FIG. 20 is a diagram showing a packet format for aggregated frames generated by the frame aggregation technique according to the related art.

Specifically, by exchanging the two NEXT pointers 8041 and rewriting the two aggregation bits 8042 hatched in FIG. 18B, the transmit descriptor for the single frame specified by the separate transmission pointer 902 can be linked with the transmit descriptor for the aggregated frame. By reading MAC frames one after another from the transmit buffer 803 based on the transmit descriptor table 804 in which the NEXT pointers 8041 have been exchanged as shown in FIG. 18B, the PHY unit 133 links and transmits the MAC frames, making it possible to transmit a MAC frame containing feedback information such as a TCP ACK packet as soon as possible.

Other Embodiments

In the network configuration according to the first embodiment of the present invention, the FTP server 11 is connected directly with the access point 12 via a wired LAN. Needless to say, this network configuration is only exemplary. For example, the FTP server 11 may be installed on an IP subnet different from the access point 12 or installed via the Internet. Alternatively, the FTP server 11 and access point 12 may be configured as a single common computer. In that case, the bridge between the wired LAN and wireless LAN is not strictly necessary, and thus the bridge unit 121 of the access point 12 may be omitted.

Although file transfer via the FTP protocol has been described as an example in the first embodiment of the present invention, higher-layer protocols are not limited to FTP. Also, the higher-layer communication protocol for window control is not limited to FTP cited specifically.

Also, a wireless LAN under consideration for standardization by IEEE 802.11 has been cited as an example of a protocol that improves frame transfer efficiency by using frame aggregation in a lower layer in the first embodiment of the present invention. However, in an environment where feedback flow control is performed in a higher layer, the lower-layer communication protocol that performs data transfer using a frame aggregation technique is not limited to the wireless LAN described above.

Also, although a case in which a communication medium is a wireless channel has been described in the first embodiment of the present invention, the communication channel may be a wired transmission line. For example, with 1000 BASE-T that uses a twisted-pair cable as a physical medium, the determination as to whether to transmit MAC frames as a frame burst or single MAC frames may be made based on the type of data segment contained in the MAC frames, where the frame burst involves transmitting a plurality of MAC frames successively.

Also, although only TCP ACK is recited as an example of feedback information in the first embodiment, the feedback information may be other information, such as RTCP (RTP Control Protocol) feedback information.

As described above, the communication apparatus according to the embodiments can select whether to supply an aggregated frame created by aggregating multiple data frames or an unaggregated single frame to the physical layer processing unit that carries out data transmission by accessing a communication medium. Furthermore, the communication apparatus according to the embodiments determines whether to transmit the data frame as an aggregated frame or a single frame, based on type of data contained in a payload of the data frame. For example, a data frame that includes feedback information for another communication apparatus, such as a TCP ACK segment, in its payload can be supplied singly to the physical layer processing unit without being aggregated with other data frames. Thus, even when communication efficiency is normally increased by frame aggregation in lower layers, by selectively returning a data frame that includes feedback information in its payload as a single frame, the communication apparatus according to embodiments of the present invention can return feedback information to the other communication apparatus sooner than when an aggregated frame is used, where the other communication apparatus is a sender of data segments in a higher layer. That is, the communication apparatus according to embodiments of the present invention can improve throughput in the higher layer in which feedback flow control is performed.

While embodiments and examples of the present invention have been described in detail above, it is contemplated that numerous modifications may be made to the above embodiments without departing from the spirit and scope of the embodiments of the present invention as defined in the following claims and their legal equivalents.

What is claimed is:

1. A communication apparatus comprising:
   a physical layer processing unit that transmits data to a communication medium; and
   a lower-layer processing unit that performs transmission control, wherein the transmission control includes at least one of aggregated-frame transmission control in which a data frame is supplied to the physical layer processing unit as an aggregated frame by aggregating the data frame with at least one other data frame, and single-frame transmission control in which the data frame is supplied to the physical layer processing unit as a single frame,
   wherein the lower-layer processing unit determines whether to supply the data frame to the physical layer processing unit as the aggregated frame by performing the aggregated-frame transmission control or as the single frame by performing the single-frame transmission control based on a type of data contained in a payload of the data frame.

2. The communication apparatus according to claim 1, wherein the lower-layer processing unit supplies the data frame to the physical layer processing unit as the single frame by performing the single-frame transmission control if feedback information for another communication apparatus is contained in the payload of the data frame.

3. The communication apparatus according to claim 2, wherein the data frame containing the feedback information is transmitted to the physical layer processing unit as the single frame by performing the single-frame transmission control in response to a transmission delay or a retransmission of the data with another communication apparatus.

4. The communication apparatus according to claim 2, wherein the lower-layer processing unit switches the transmission control between the aggregated-frame transmission control and the single-frame transmission control based on whether the data frame contains the feedback information.

5. The communication apparatus according to claim 2, wherein the feedback information is used for flow control by the other communication apparatus.

6. The communication apparatus according to claim 2, wherein the feedback information is a TCP (Transmission Control Protocol) ACK segment or RTCP (RTP Control Protocol) feedback information.

7. The communication apparatus according to claim 1, further comprising:
   a higher-layer processing unit that controls transmission and reception of data segments; and
   a determination unit that determines whether to supply the data frame as the single frame based on a change in a rate per time of sequence numbers contained in the data segments supplied from the higher-layer processing unit to the lower-layer processing unit or supplied from the lower-layer processing unit to the higher-layer processing unit.

8. The communication apparatus according to claim 1, further comprising:
   a first transmit data queue that stores the single frame;
   a second transmit data queue that stores the aggregated frame; and
   a transmit data queue control unit that supplies data stored in the first transmit data queue, in preference to data stored in the second transmit data queue, to the physical layer processing unit.

9. The communication apparatus according to claim 1, wherein the communication medium is a wireless communication channel.

10. A data frame transmission control method comprising:
    an identifying operation comprising identifying a type of data contained in a payload of a data frame; and
    a first determining operation comprising determining whether to transmit the data frame to a communication medium as an aggregated frame by aggregating the data frame with at least one other data frame or as a single frame based on the type of the data identified by the identifying operation.

11. The data frame transmission control method according to claim 10, wherein the first determining operation determines to transmit the data frame as the single frame if feedback data contained in the payload is identified by the identifying operation.

12. The data frame transmission control method according to claim 10, further comprising:
 a second determining operation comprising determining whether a transmission delay or a retransmission of the data has occurred,
 wherein the first determining operation determines to transmit the data frame as the single frame the second determining operation determines that the transmission delay or the retransmission has occurred.

13. The data frame transmission control method according to claim 12, wherein the second determining operation determines whether the transmission delay or retransmission of the data has occurred based on a change in a rate per time of sequence numbers contained in a plurality of sequentially transmitted or received data segments.

14. A non-transitory computer-readable medium comprising software instructions for a data frame transmission control method, the method comprising:
 an identifying operation comprising identifying a type of data contained in a payload of the data frame; and
 a first determining operation comprising determining whether to transmit the data frame to a communication medium as an aggregated frame by aggregating the data frame with at least one other data frame or as a single frame based on the type of the data identified by the identifying process.

15. The non-transitory computer-readable medium according to claim 14, wherein the first determining operation determines to transmit the data frame as the single frame if feedback data contained in the payload is identified by the identifying process.

16. The non-transitory computer-readable medium according to claim 14, further comprising:
 a second determining operation comprising determining whether a transmission delay or retransmission of the data with another communication apparatus has occurred, wherein the first determining process determines to transmit the data frame as the single frame if the second determining process determines that the transmission delay or retransmission has occurred.

17. The non-transitory computer-readable medium according to claim 16, wherein the second determining operation determines whether the transmission delay or retransmission of the data segment occurred based on a change in a rate per time of sequence numbers contained in a plurality of sequentially transmitted or received data segments.

* * * * *